(12) United States Patent
Li et al.

(10) Patent No.: US 12,192,857 B2
(45) Date of Patent: Jan. 7, 2025

(54) HARQ FEEDBACK FOR GROUPCAST ON NEW RADIO UU INTERFACE

(71) Applicant: IPLA Holdings Inc., New York, NY (US)

(72) Inventors: Yifan Li, Conshohocken, PA (US); Qing Li, Princeton Junction, NJ (US); Patrick Svedman, Stockholm (SE); Allan Y. Tsai, Boonton, NJ (US); Mohamed Awadin, Plymouth Meeting, PA (US); Kyle Pan, Saint James, NY (US); Lakshmi R. Iyer, King of Prussia, PA (US); Pascal M. Adjakple, Great Neck, NY (US); Guodong Zhang, Woodbury, NY (US)

(73) Assignee: IPLA HOLDINGS INC., New York, NY (US)

( * ) Notice: Subject to any disclaimer, the term of this patent is extended or adjusted under 35 U.S.C. 154(b) by 421 days.

(21) Appl. No.: 17/764,560

(22) PCT Filed: Oct. 2, 2020

(86) PCT No.: PCT/US2020/054008
§ 371 (c)(1),
(2) Date: Mar. 29, 2022

(87) PCT Pub. No.: WO2021/067753
PCT Pub. Date: Apr. 8, 2021

(65) Prior Publication Data
US 2022/0360950 A1    Nov. 10, 2022

Related U.S. Application Data

(60) Provisional application No. 62/910,692, filed on Oct. 4, 2019, provisional application No. 63/062,150, filed on Aug. 6, 2020.

(51) Int. Cl.
*H04W 4/06* (2009.01)
*H04L 1/1812* (2023.01)
*H04L 5/00* (2006.01)

(52) U.S. Cl.
CPC ............ *H04W 4/06* (2013.01); *H04L 1/1812* (2013.01); *H04L 5/0051* (2013.01)

(58) Field of Classification Search
CPC .... H04W 4/06; H04L 1/11812; H04L 1/1854; H04L 1/1864; H04L 1/1896; H04L 5/0051; H04L 5/0055
See application file for complete search history.

(56) References Cited

U.S. PATENT DOCUMENTS

2017/0310431 A1    10/2017  Iyer
2019/0123923 A1    4/2019   Belleschi
(Continued)

FOREIGN PATENT DOCUMENTS

| CN | 107920333 A | 4/2018 |
|----|-------------|--------|
| CN | 110178389 A | 8/2019 |
| WO | 2019/160737 A1 | 8/2019 |

OTHER PUBLICATIONS

International Search Report and Written Opinion mailed on Dec. 17, 2020, received for PCT Application PCT/US2020/054008, Filed on Oct. 2, 2020, 15 pages including English Translation.

(Continued)

*Primary Examiner* — Jamal Javaid
(74) *Attorney, Agent, or Firm* — XSENSUS LLP

(57) ABSTRACT

Disclosed herein are methods and apparatus for HARQ feedback in NR Uu groupcast or broadcast, including methods for assigning and releasing the groupcast RNTI for Uu groupcast or broadcast, methods for enabling and disabling the HARQ feedback for Uu groupcast or broadcast, and methods for HARQ feedback and corresponding resource allocation for Uu groupcast or broadcast, including ACK- (Continued)

NACK based Uu groupcast HARQ feedback, NACK only based Uu groupcast HARQ feedback, and Enhanced ACK-NACK based Uu groupcast HARQ feedback. Also disclosed herein are methods for collision handling between HARQ feedback for Uu broadcast/groupcast and other transmissions.

15 Claims, 14 Drawing Sheets

(56) References Cited

U.S. PATENT DOCUMENTS

| | | |
|---|---|---|
| 2019/0306923 A1 | 10/2019 | Xiong |
| 2021/0028910 A1* | 1/2021 | Cheng .................. H04L 1/1854 |
| 2021/0258104 A1* | 8/2021 | Ye ........................ H04W 72/23 |

OTHER PUBLICATIONS

Vivo, "Indication and resource configuration on HARQ enable/disable", 3GPP TSG-RAN WG2 Meeting #107bis, R2-1912255, Oct. 14-18, 2019, 5 pages.
Physical layer procedure for NR-V2X sidelink , 3GPP TSG-RAN WG1#98 R1-1908364, Aug. 16, 2019.

* cited by examiner

HARQ FEEDBACK FOR GROUPCAST ON NEW RADIO UU INTERFACE

CROSS-REFERENCE TO RELATED APPLICATIONS

This application is based on PCT filing PCT/US2020/054008, filed Oct. 2, 2020, which claims the benefit of U.S. Provisional Patent Application No. 62/910,692, filed on Oct. 4, 2019, entitled "Harq Feedback for Groupcast on New Radio UU Interface," and U.S. Provisional Patent Application No. 63/062,150, filed on Aug. 6, 2020, entitled "Harq Feedback for Groupcast on New Radio UU Interface" the entire contents of each are hereby incorporated by reference herein.

BACKGROUND

LTE MBMS (Multimedia broadcast multicast services) supports broadcast/multicast services in a cellular system, where the same content is simultaneously transmitted to the UEs located in an area.

In LTE, MBMS service area is defined as the area that all the UEs receive the same broadcast/multicast services. An MBMS service area may comprise one or multiple cells.

Two types of mechanism are supported in LTE for broadcast/multicast services: MBSFN (Multicast-Broadcast Single Frequency Network), and SC-PTM (Single-Cell Point to Multipoint).

MBSFN is introduced to LTE in Rel-8, which targets the use case when the MBMS service is of interest over a larger area, e.g., for TV broadcasting. Different cells within the same MBSFN area are mutually time aligned and broadcast the identical information. Therefore, from a UE perspective, the transmissions received from multiple cells can be seen as a single transmission received from one cell subject to severe multi-path propagation as long as the cyclic prefix is large enough, and the UE does not need to know which cell are actually involved in the transmission.

In LTE MBSFN, broadcast/multicast services are transmitted on the dedicated physical channel PMCH (Physical Multicast Channel) in the MBSFN subframes. Within one MBSFN subframes, all the MBSFN transmissions correspond to the same MBSFN area. However, the MBSFN transmissions in different subframes may correspond to different MBSFN areas.

To support coherent demodulation for the received MBSFN transmission, MBSFN area specific MBSFN reference signals are transmitted in the MBSFN subframe. All the cells within the same MBSFN area transmit the MBSFN reference signals at the same time-frequency location and with the same reference-symbol values. Since only one single MBSFN reference signal is transmitted in the MBSFN subframe, MIMO scheme is not supported in LTE MBSFN.

SC-PTM is introduced to LTE in release 13 in order to support MBMS services when it is of interest in a single cell or in a small area consisting of a few cells. Different from the MBSFN, SC-PTM transmissions reuse the PDSCH (Physical Downlink Shared Channel).

Similar to the unicast transmission, the SC-PTM transmission is dynamically scheduled by the DCI. G-RNTI (Group Radio Network Temporary Identifier) is used to scramble the DCI scheduling the SC-PTM transmission. For different MBMS services, different G-RNTIs are used for UE to receive the SC-PTM transmission that it is interested in.

In LTE SC-PTM, HARQ (Hybrid Automatic Repeat Request) feedback and CSI (Channel State Information) reports are not supported. Consequently, only the transmission modes 1-3, which do not rely on feedback, are supported.

In NR (New Radio), Uu broadcast/groupcast is identified to be beneficial in many use cases, such as V2X (Vehicle-to-everything) communication, public safety, video and audio distribution, IIoT (Industrial Internet of Things), media streams, various types of content distribution, etc.

Comparing to the LTE, the NR Uu broadcast/groupcast use cases usually have a smaller communication range and require higher reliability and lower latency in many scenarios.

SUMMARY

In LTE MBMS service, reliability is handled by the service layer or application layer while HARQ feedback mechanism is not supported. However, since the NR Uu groupcast use cases, such as V2X, IIoT, etc., may require higher reliability and lower latency, handling the reliability in the service layer or application layer may not be sufficient anymore. It is beneficial to introduce a HARQ feedback mechanism to groupcast at the NR Uu interface to support transmission reliability, while ensuring the appropriate latency for the QoS (Quality of Service) requirements.

Disclosed herein are methods and apparatus for HARQ feedback in NR Uu groupcast or broadcast, including:

(1) methods for assigning and releasing the groupcast RNTI for Uu groupcast or broadcast, including groupcast RNTI assignment for common groupcast service, groupcast RNTI assignment for event triggered groupcast service, and groupcast RNTI releasing for event triggered groupcast service;

(2) methods for enabling and disabling the HARQ feedback for Uu groupcast or broadcast, including service based HARQ enabling and disabling for Uu groupcast or broadcast, transmission based HARQ enabling and disabling for Uu groupcast or broadcast, hybrid HARQ enabling and disabling for Uu groupcast or broadcast, and UE based HARQ enabling and disabling for Uu groupcast or broadcast; and (3) methods for HARQ feedback and corresponding resource allocation for Uu groupcast or broadcast, including ACK-NACK based Uu groupcast HARQ feedback, NACK only based Uu groupcast HARQ feedback, and Enhanced ACK-NACK based Uu groupcast HARQ feedback.

In NR, while a UE is receiving broadcast and/or groupcast service(s) via Uu interface, the UE may operate with other services, e.g., unicast service via Uu interface, sidelink feedback via Uu interface, sidelink service via PC5 interface. In this case, the UL feedback for broadcast/groupcast may overlap or partial overlap with other UL transmission, e.g., UL feedback for another broadcast/groupcast via Uu interface, UL transmission for unicast (PUCCH, PUSCH) via Uu interface, sidelink feedback via Uu interface, sidelink transmission via PC5 interface, etc. Methods are needed to define the UE behaviors when such collisions occur resulting from overlap or partial overlap of different transmissions. To this end, the following are further disclosed herein:

Collision handling between GC HARQ and other HARQ feedbacks;

Collision handling between GC HARQ and other UCIs;

Collision handling between GC HARQ and PUSCH, including a mechanism to determine beta_offset for GC HARQ piggybacking;

Collision handling between GC HARQ and SRS;

Collision handling between GC HARQ and PRACH:

Collision handling between GC HARQ and sidelink transmission;

Predefined dropping or multiplexing rules;

Priority-based dropping or multiplexing rules: and

Mapping orders when multiplexing is adopted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION

A number of the abbreviations used herein are described in Table 0 o the Appendix.
Uu Groupcast RNTI Configuration To support the Uu groupcast, a new RNTI (Radio Network Temporary Identifier), NR-G-RNTI, may be introduced in NR. The DCI (Downlink Control Information) scheduling the NR Uu groupcast transmission may be scrambled by the NR-G-RNTI. A UE need to be aware of the used NR-G-RNTI to detect the corresponding scheduling DCI and decode the scheduling information. In this subsection, we provide various solutions on the NR-G-RNTI assigning and releasing mechanism.
NR-G-RNTI Assignment for Broadcast and Common Groupcast Service.

When groupcast service is supported in an area, the gNB(s) may indicate the UEs in the cell the groupcast based on different services. This allows the UE to autonomously select if it will receive the service or not. Such information is typically statically configured.

Figure 1:
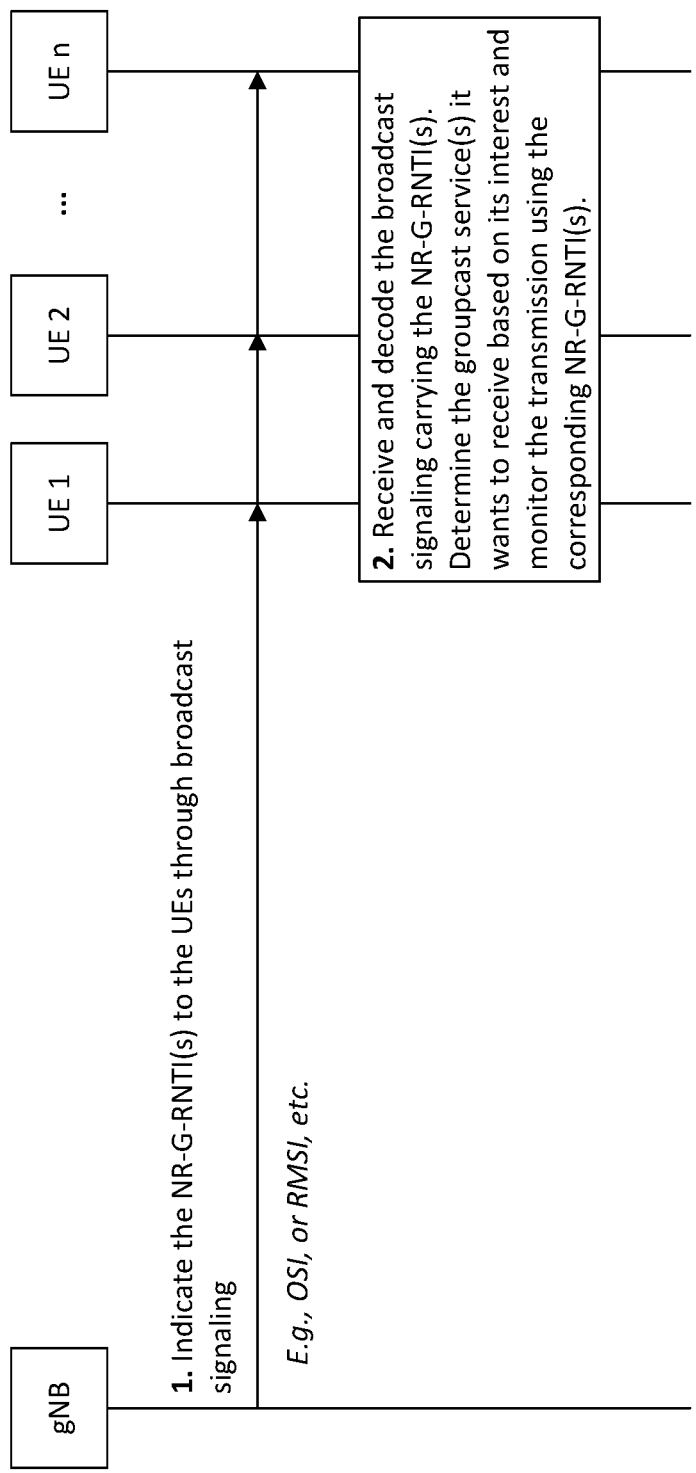
FIG. 1 shows an example method for NR-G-RNTI assigning and selecting for common groupcast services.

The gNB(s) may initiate and inform the served UEs a NR-G-RNTI used for a common groupcast of a service through broadcast signaling. The difference of a common groupcast service form the broadcast service may be if HARQ feedback is required in the service, etc. A high-level overview of the NR-G-RNTI assignment and selection procedure for common groupcast services is depicted in FIG. 1, which may contain the following steps:
Step 1: gNB Broadcasts the NR-G-RNTI(s).

gNB may broadcast the common groupcast service(s) it is providing and indicate the corresponding NR-G-RNTI(s) through broadcast signaling, e.g., through OSI (Other System Information), or through RMSI (Remain Minimum System Information), etc. For example, the NR-G-RNTI may be included directly in system information message. The transmission of the system information may be mapped to new physical channel specified to this end for example an NR Physical Multicast Channel or may be mapped to a PDSCH. The NR-G-RNTI(s) transmitted may have one to one mapping with the service(s) provided by the gNB, e.g. each groupcast service is assigned a different, e.g. unique in the cell(s), NR-G-RNTI.
Step 2: UE Determines the NR-G-RNTI(s) to be Used for Monitoring the DCI Based on its Interest.

A UE may monitor and decode the broadcast message such as RMSI or OSI carrying the NR-G-RNTI(s) information sent by the gNB. Once the UE figure out the groupcast service(s) provided by the gNB, the UE may determine the groupcast service(s) it wants to receive.

Or the UE may first determine which groupcast service it wants to receive, and then it may receive and decode the corresponding broadcasted message carrying the NR-G-RNTI(s) information.

The UE may monitor and receive the desired groupcast transmission using the associated NR-G-RNTI(s).

Similar mechanism may be applied to the Uu broadcast. A RNTI, e.g., NR-B-RNTI may be used for indicating a NR Uu broadcast transmission. Or, with another alternative, the same RNTI, e.g., NR-G-RNTI, may be used for indicating both NR Uu broadcast transmission and NR Uu groupcast transmission. When the same RNTI is used, broadcast and groupcast may be differentiated by other criteria. e.g., if HARQ is required for the transmission.

When a different RNTI is used, the gNB may indicate different RNTIs for broadcast services through broadcast signaling, e.g., through OSI, RMSI, etc. In one example, different broadcast signalings, e.g., two different SIBs, may be used to transmit the NR-B-RNTI and NR-G-RNTI respectively. Or two different information elements transmitted in the same broadcast signaling may be used to transmit the NR-B-RNTI and NR-G-RNTI respectively. Or two different RRC configurations configured in the same information element which is transmitted in a broadcast signaling may be used to transmit the NR-B-RNTI and NR-G-RNTI, respectively.

NR-G-RNTI Assignment for Event Triggered Groupcast Service.

While a gNB may consistently provide the common groupcast services for an area, the gNB may sporadically provide temporary groupcast service to a group of UEs based on some triggering.

Such triggering may be from its own higher layer, e.g., the gNB's higher layer, in the event such as there may be a same transmission need to be delivered to multiple UEs. Or such triggering may be indicated by the UE. For example, multiple UEs may send the requests for the same service. Then the gNB may form them as a group and groupcast the information to the UEs.

Figure 2:
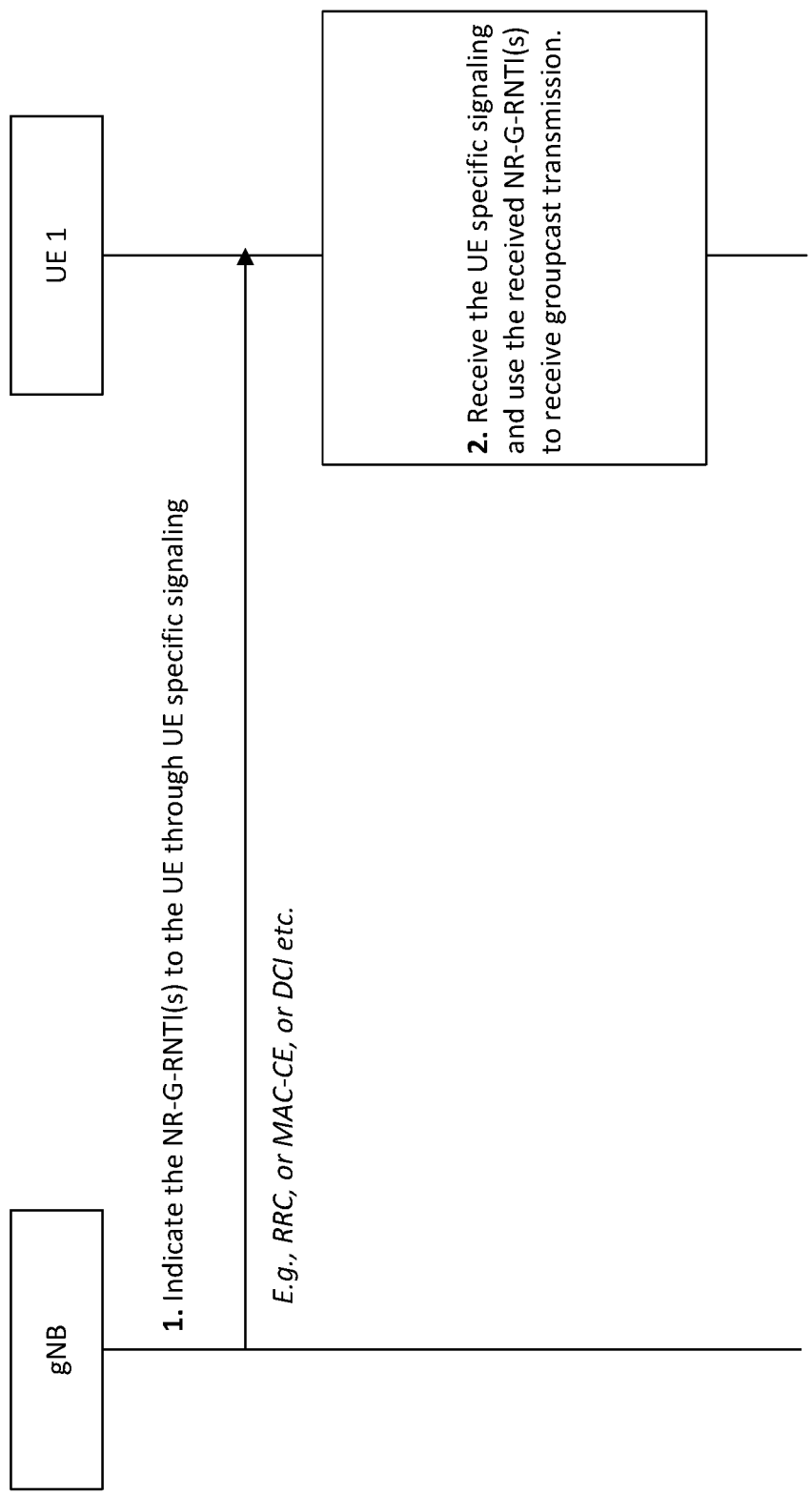
FIG. 2 shows an example method for NR-G-RNTI assignment for event triggered groupcast service using UE specific signaling.

NR-G-RNTI Assignment for Event Triggered Groupcast Service Using UE Specific Signaling The gNB(s) may indicate the NR-G-RNTI(s) used for event triggered groupcast transmission(s) through UE specific signaling. A high-level overview of the NR-G-RNTI assignment procedure is depicted in FIG. 2, which may contain the following steps:

Step 1: gNB Unicasts the NR-G-RNTI(s) to the UE.

gNB may indicate the NR-G-RNTI(s) used for event triggered groupcast service to a UE through UE specific signaling, e.g., through UE specific RRC signaling, or through MAC-CE (MAC Control Element), or through the UE specific DCI.

For example, if UE specific RRC is used, it may contain an RRC configuration to indicate the value of the configured NR-G-RNTI. If UE specific DCI is used, it may contain a field to indicate an index. The indicated index may be associated with the row number of a pre-configured table, where each row may be indicating an NR-G-RNTI.

This approach may be applied to the case when the gNB is indicated by its higher layer or is triggered by the UEs to form a temporary group and provide the event triggered groupcast service.

This approach may also be applied to the case when a groupcast service already exists, e.g., gNB may already form some UEs as a group and perform groupcast transmission to them, and the gNB is indicated by its higher layer or is triggered by the UE that a UE can be added to the group to receive the same groupcast service.

Step 2: UE Receives the NR-G-RNTI(s) and Use it for Monitoring the DCI.

Once a UE receives the UE specific signaling and decodes the indicated NR-G-RNTI(s), the UE may start to use it for monitoring the DCI and for receiving the groupcast transmission.

Note, the term "UE specific signaling" is sometimes also referred as "UE dedicated signaling". It should be understood throughout this disclosure, unless otherwise stated, the term "UE specific signaling" may be interchanged by the term "UE dedicated signaling".

NR-G-RNTI Assignment for Event Triggered Groupcast Service Using Broadcast/Groupcast Signaling While assigning the NR-G-RNTI to the UE through UE specific signaling may be beneficial for the case when the number of the UEs involved in the groupcast transmission is small, such mechanism may become challenging when the number of the UEs is large since the overhead introduced by the UE specific signaling may be high.

Figure 3:
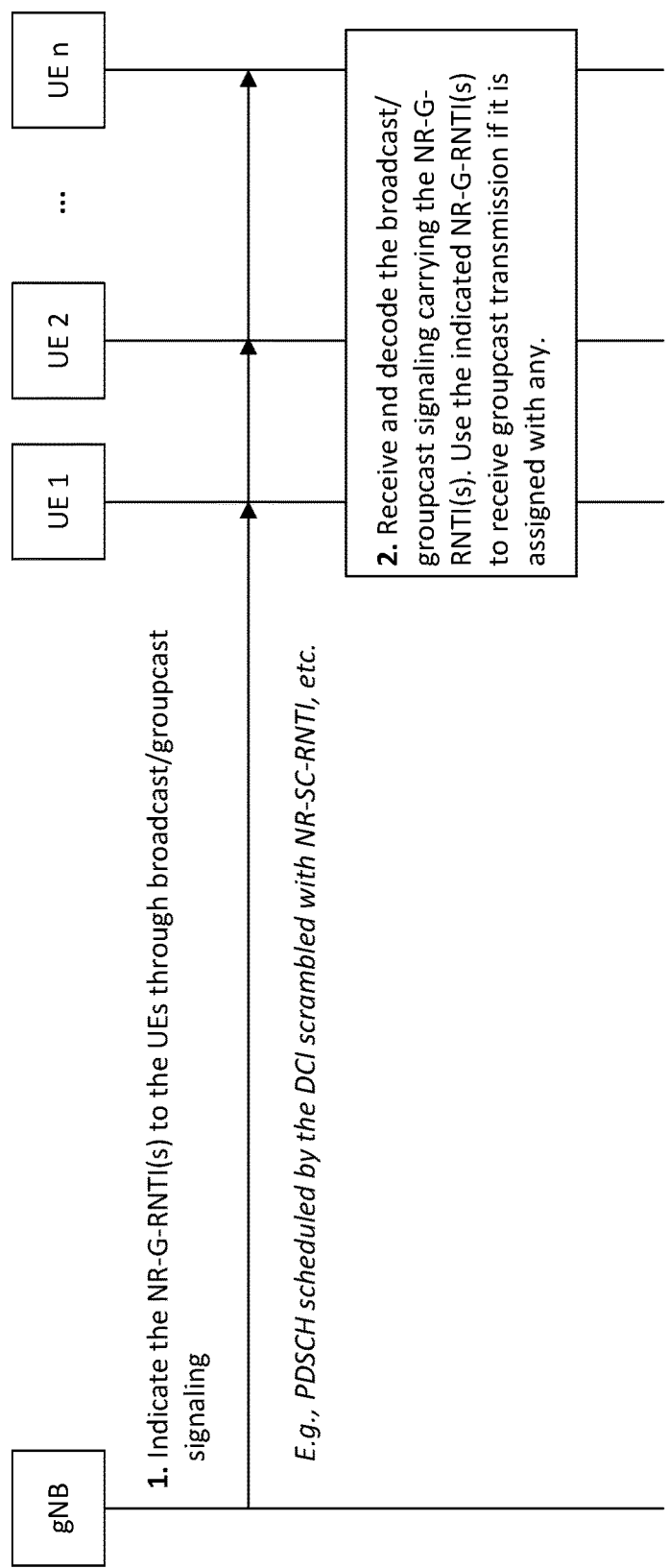
FIG. 3 shows an example method for NR-G-RNTI assignment for event triggered groupcast service using broadcast/groupcast signaling.

Therefore, in an example, the gNB(s) may indicate the NR-G-RNTI(s) used for event triggered groupcast transmission(s) through broadcast/groupcast signaling. A high-level overview of the NR-G-RNTI assignment procedure is depicted in FIG. 3, which may contain the following steps:

Step 1: gNB Broadcasts the NR-G-RNTI(s) Assignment.

gNB may indicate the NR-G-RNTI(s) used for event triggered groupcast service to a UE through broadcast/groupcast signaling. E.g., the NR-G-RNTI may also be configured into the UE in RRC system information broadcast signaling, or in a Layer 2 Signaling for e.g. using a new MAC CE that carries the NR-G-RNTI.

For example, a paging like approach may be adopted. The UE may be configured by the gNB to periodically monitor a broadcast/groupcast transmission on the PDSCH. The UE may perform such monitoring by periodically monitoring the DCI scheduling the broadcast/groupcast transmission on the PDSCH. A new RNTI, e.g., NR-SC-RNTI, may be used to scramble such DCI. The value of the NR-SC-RNTI may be pre-defined in the spec or may be configured to the UE through broadcast signaling, e.g., OSI or RMSI.

If a UE detects a DCI scrambled with NR-SC-RNTI is transmitted, the UE may decode the associated PDSCH to receive the NR-G-RNTI assigning information.

For example, a list of the assigned NR-G-RNTI(s) and the corresponding UE(s) need to monitor the assigned NR-G-RNTI(s) may be configured by an RRC message transmitted in the decoded PDSCH. One NR-G-RNTI may be associated with one or more UEs, e.g., by indicating the C-RNTIs of the UEs under the configured NR-G-RNTI.

This approach may be applied to the case when the gNB is indicated by its higher layer or is triggered by the UEs to form a temporary group and provide the event triggered groupcast service to a large amount of UEs.

In another approach, the NR-G-RNTI(s) may be also directly indicated by the DCI scrambled with NR-SC-RNTI.

In yet another example, when a Layer 2 signaling is used, the MAC CE may be mapped to a broadcast channel, a shared channel such as PDSCH or multicast channel. The transmission of the corresponding MAC PDU by the PHY layer may be scrambled by a new RNTI for e.g. NR-SC-RNTI.

Step 2: UE Receives the NR-G-RNTI(s) Assignment and Check if it is Assigned with NR-G-RNTI.

Once a UE detects there is a transmission of the NR-G-RNTI(s) assignment, the UE may receive and decode it. The UE may check if it is assigned with any NR-G-RNTI. If a UE is indicated with an NR-G-RNTI, the UE may start to use it for monitoring the DCI and for receiving the groupcast transmission. If a UE is not indicated with any NR-G-RNTI, the UE may determine no new groupcast transmission is scheduled to it.

For example, the UE may check if its ID, e.g., its C-RNTI, is indicated in the assignment. If its ID is in the list, it may figure out the corresponding NR-G-RNTI and use it for receiving the groupcast transmission. If its ID is not in the list, the UE may determine no new groupcast transmission is scheduled to it.

NR-G-RNTI Releasing for Event Triggered Groupcast Service.

After the transmission of the event triggered groupcast service is finished, gNB may send an indication to indicate the UEs to stop monitoring the groupcast transmission and release the assigned NR-G-RNTI.

NR-G-RNTI Releasing for Event Triggered Groupcast Service using UE Specific Signaling In an example, the NR-G-RNTI releasing indication may be signaled by a UE specific signaling, e.g., through UE specific RRC signaling, or through MAC-CE, or through the UE specific DCI.

When UE specific RRC is used, different information elements within a same RRC message may be used to assign and release the NR-G-RNTI respectively. Or different RRC configurations within the same information element may be used to assign and release the NR-G-RNTI respectively.

When UE specific DCI is used, in this case, each DCI transmission can only serve one of the NR-G-RNTI assigning and releasing purposes. In an example, a one-bit DCI field may be used to indicate whether the transmitted DCI is used for assigning the NR-G-RNTI or is used for releasing the NR-G-RNTI. In an example, a separate DCI field may be used to indicate the NR-G-RNTI to be assigned or release, where the same field may be reused among assigning and releasing purpose. Alternatively, indicating assigning or releasing the NR-G-RNTI can be signaled using multiple-bit DCI to increase reliability of the DCI. For example, N bits of "O" indicates assigning the NR-G-RNTI, and N bits of "T" indicates releasing the NR-G-RNTI.

In another case, one DCI transmission may be able to serve both the NR-G-RNTI assigning and releasing purposes. For example, the DCI may carry two fields, e.g., NR-G-RNTI assigning field and NR-G-RNTI releasing field, for assigning the NR-G-RNTI and releasing the NR-G-RNTI respectively. Since there may be the case when gNB does not want to perform NR-G-RNTI assigning and releasing in the same time, e.g., gNB only wants to assign NR-G-RNTI to the UE, the value of all '0' for these two field may be reserved for indicating not assigning or releasing NR-G-RNTI respectively. An example of 3 bits NR-G-RNTI releasing field is shown in Table 1 of the Appendix. The example of the field design shown in Table 1 may be also applied to the case that DCI can only assign the NR-G-RNTI or can only release the NR-G-RNTI.

NR-G-RNTI Releasing for Event Triggered Groupcast Service using Broadcast/Groupcast Signaling In an example, the NR-G-RNTI releasing indication may be signaled by broadcast/groupcast signaling. Similar idea proposed for assigning the NR-G-RNTI for event triggered groupcast service though broadcast/groupcast signaling may be also applied here.

For example, the PDSCH scheduled by the DCI scrambled with the NR-SC-RNTI may carry two lists. One list is used for assigning the NR-G-RNTI and the other one may be used for releasing the NR-G-RNTI.

The two lists may be configured by different information elements within a same RRC message respectively. Or the two lists may be configured by different RRC configurations within a same information element respectively.

In yet another example, the PDSCH scheduled by the DCI scrambled with the NR-SC-RNTI may carry one list. In the list, gNB may indicate all the UEs assigned to receive the groupcast transmission. For a UE, if it is in the list, the UE may assume the groupcast is active, and it will receive the transmission; if it is not or it is no longer in the list, the UE may assume the groupcast is not active or is no longer active, and it will not receive the transmission.

HARQ Enabling and Disabling for Uu Groupcast.

In NR Uu groupcast, e.g., groupcast service or broadcast service, may be adopted for different use cases, e.g., V2X, public safety, IIoT and etc. Different services may have different QoS requirements on the reliability. For the service requiring high reliability. HARQ feedback mechanism may be applied to guarantee the QoS. On the other hand, for the service with relaxed reliability requirement, HARQ feedback mechanism may not be needed to save the spectrum. Even for the services requiring high reliability, the HARQ feedback mechanism may not be always needed. For example, the HARQ feedback may be turned on for some transmission occasions while the it may be turned off for some other transmission occasions according to the channel condition, traffic load, and etc.

Therefore, in an example, the HARQ feedback for Uu groupcast may be enabled or disabled. In this subsection, we provide various solutions on the Uu groupcast HARQ feedback enabling/disabling mechanism. In the following we use groupcast service as the example. However, the disclosed solutions may be also applied to broadcast service.

Service Based HARQ Enabling and Disabling for Uu Groupcast

Since different Uu groupcast services may have different reliability requirements, the Uu groupcast HARQ feedback may be enabled or disabled based on the service type. A UE may determine if it needs to conduct HARQ feedback procedure based on the type of the Uu groupcast services.

A one to one association between the Uu groupcast service and if HARQ feedback procedure needs to be conducted for the Uu groupcast transmission may be indicated by the gNB. In an example, RRC signaling may be used for this purpose.

Figure 4:
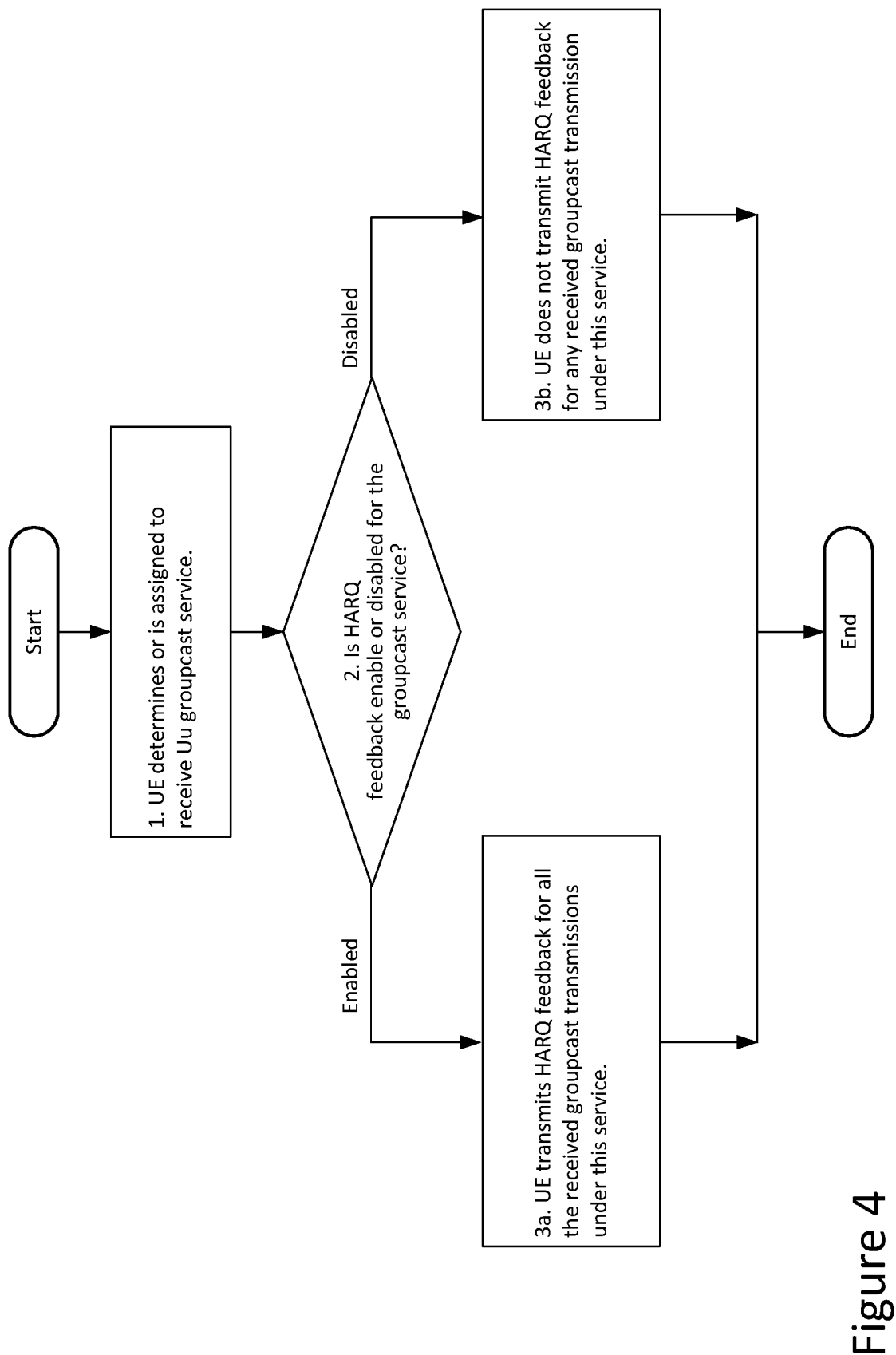
FIG. 4 shows an example method for service based HARQ enabling and disabling determination for Uu groupcast.

In this approach, when HARQ is enabled for a groupcast service, the UE should conduct HARQ feedback procedure for all the groupcast transmissions related to it; and when HARQ is disabled for a groupcast service, the UE should not conduct HARQ feedback procedure for any of the groupcast transmission related to it. A high-level overview of the flowchart of service based HARQ enabling and disabling determination for Uu groupcast is depicted in FIG. 4.

For a Uu groupcast service, the HARQ enabling/disabling may be implicitly or explicitly indicated. For example, it may be implicitly indicated by the value of the NR-G-RNTI, e.g., $n_{NR\text{-}G\text{-}RNTI}$, assigned for the Uu groupcast service.

Even/Odd Based HARQ Enabling/Disabling

In an example, whether the HARQ feedback is enabled or disabled may be implicitly indicated by whether the value of the NR-G-RNTI is even or odd.

For example, when a UE is assigned with a NR-G-RNTI to be odd, the UE may determine HARQ feedback is enabled for the Uu groupcast transmissions associated with it; when a UE is assigned with a NR-G-RNTI to be even, the UE may determine HARQ feedback is disabled for the Uu groupcast transmissions associated with it, and vice versa.

Value Range Based HARQ Enabling/Disabling

In an example, the value of the NR-G-RNTI may be divided into two categories. Whether the HARQ feedback is enabled or disabled may be implicitly indicated by which category the value of the NR-G-RNTI falls into.

An example of the NR-G-RNTI categories is shown in Table 2 of the Appendix. For example, when a UE is assigned with a NR-G-RNTI with $n_0 \leq n_{NR\text{-}G\text{-}RNTI} \leq n_1$, the UE may determine HARQ feedback is enabled for the Uu groupcast transmissions associated with it; when a UE is assigned with a NR-G-RNTI with $n_1 < n_{NR\text{-}G\text{-}RNTI} \leq n_2$, the UE may determine HARQ feedback is disabled for the Uu groupcast transmissions associated with it, and vice versa.

The values of the $n_0$, $n_1$, $n_2$ may be predefined in a protocol specification. Or, in another case, some of or all of the values of the $n_0$, $n_1$, $n_2$ may be configured by the gNB through RRC configuration, e.g., through RRC configuration NR_Uu_Groupcast_n1.

Explicit HARQ Enabling/Disabling

Besides the implicit indicating, the association between the Uu groupcast service and the HARQ enabling/disabling may also be explicitly indicated.

For example, when the gNB configures the NR-G-RNTI to the UEs, it may also explicitly configure HARQ enabling/disabling information to the UEs, e.g., through RRC configuration NR_Uu_Groupcast_HARQ. An example of the RRC information element NR_Uu_Groupcast_Config used for configuring the groupcast related information is shown in Code Example 1 of the Appendix.

In the example shown in Code Example 1, one RRC configuration for HARQ enabling/disabling is configured for each Uu groupcast service. In another example, gNB may configure two lists, e.g., using two information elements NR_Uu_Groupcast_HARQ_Enable_List and NR_Uu_Groupcast_HARQ_Disable_List, to indicate which groupcast services are enabled with HARQ and which are disabled. This approach may be applied to the case when gNB is providing common groupcast services. Examples of the two information elements are shown in Code Example 2 and Code Example 3 of the Appendix respectively.

When a UE determines to receives a common groupcast service, the UE may check which list the interested groupcast service is under. If the groupcast service is indicated in information element NR_Uu_Groupcast_HARQ_Enable_List, the UE may determine HARQ feedback is enabled for the Uu groupcast transmissions associated with it; if the groupcast service is indicated in information element NR_Uu_Groupcast_HARQ_Disable_List, the UE may determine HARQ feedback is disabled for the Uu groupcast transmissions associated with it.

Transmission Based HARQ Enabling and Disabling for Uu Groupcast

In some cases, the HARQ feedback may be enabled or disabled flexibly by the gNB for the transmissions under the same groupcast service. To support this, the Uu groupcast HARQ feedback may be enabled or disabled for different transmissions.

Figure 5:
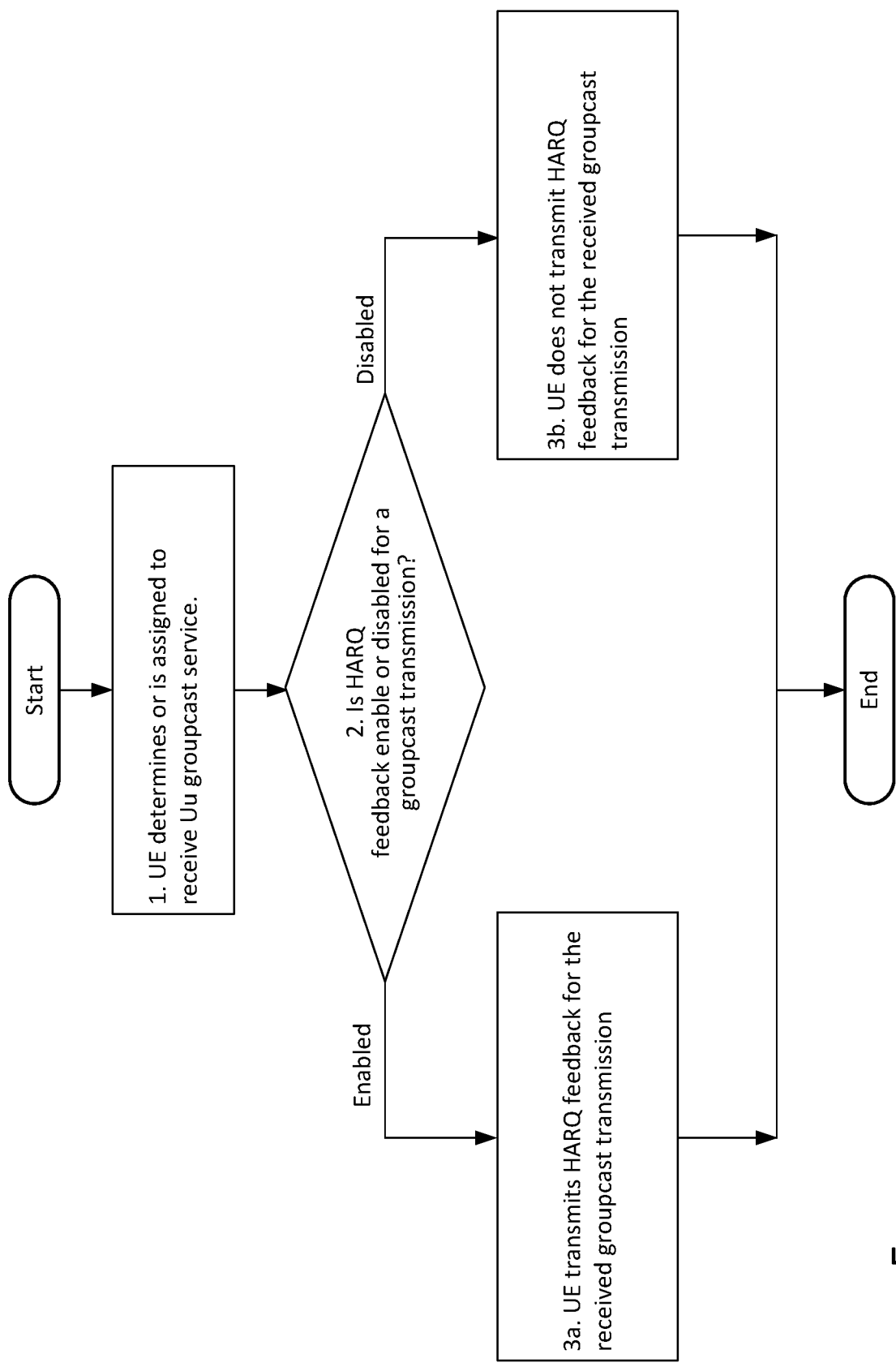
FIG. 5 shows an example method for transmission-based HARQ enabling and disabling determination for Uu groupcast.

In this approach, the HARQ feedback enabling and disabling is not associated with the groupcast service type. The UE may figure out whether the HARQ feedback is enabled or disabled for each groupcast transmission and determine if HARQ feedback needs to be conducted for the transmission correspondingly. A high-level overview of the flowchart of transmission based HARQ enabling and disabling determination for Uu groupcast is depicted in FIG. 5.

Since the indication of the HARQ enabling and disabling need to be flexibly indicated, DCI signaling may be used to send such indication and may be used by the UE to determine if HARQ feedback procedure need to be conducted for the Uu groupcast transmission.

DCI Field Based HARQ Enabling Disabling

In one approach, whether the HARQ feedback is enabled or disabled may be indicated by the DCI field in the DCI scheduling the groupcast transmission.

For example, a one-bit DCI field, e.g., HARQ Enable Indicator, may be carried by the scheduling DCI. When the HARQ enable-indicator field is set to be '0', it may indicate HARQ feedback is disabled for the scheduled transmission. When the HARQ enable indicator field is set to be '1', it may indicate HARQ feedback is enabled for the scheduled transmission. An example of the HARQ enable indicator field is shown in Table 3 of the Appendix.

PDCCH DMRS Based HARQ Enabling/Disabling

In another approach, whether the HARQ feedback is enabled or disabled may be indicated by the DMRS (Demodulation Reference Signal) transmitted in the PDCCH (Physical Downlink Control Channel) scheduling the groupcast transmission.

This approach may be beneficial to the case when different DCI formats with different DCI lengths are used for scheduling the HARQ enabled groupcast transmission and HARQ disabled groupcast transmission respectively. For example, when gNB schedules HARQ disabled groupcast transmission, it may reuse the DCI format used for scheduling the unicast transmission. While, when the gNB schedules HARQ enabled groupcast transmission, it may use another DCI format if longer DCI needed for more information to be indicated. Indicating the HARQ enabling/disabling information through PDCCH DMRS can allow the UE to be aware of such information before decoding the DCI. Therefore, it can reduce the number of blind decoding need to be conducted.

Such information may be indicated by the DMRS port of the transmitted PDCCH DMRS. For example, when scheduling the groupcast transmission, the gNB may transmit one of the two pre-defined or pre-configured FDM-ed (Frequency-Division Multiplexing) or TDM-ed (Time-Division Multiplexing) DMRS in the PDCCH, e.g., one with frequency offset $f_{offset}=0$ RB and the other one with $f_{offset}=1$ RB, to indicate whether HARQ is enabled or disabled for the scheduled transmission. For example, when the UE detects the PDCCH DMRS is transmitted with $f_{offset}=0$ RB, the UE may determine HARQ is enabled for the scheduled transmission; when the UE detects the PDCCH DMRS is transmitted with $f_{offset}=1$ RB, the UE may determine HARQ is disabled for the scheduled transmission, and vice versa.

Such information may be indicated by the DMRS sequence of the transmitted PDCCH DMRS. For example, the sequence initialization for PDCCH DMRS may be given by the following equation:

$$c_{init}=(2^{17}(N_{symb}^{slot}n_{s,f}^{\mu}+l+1)(2N_{ID}+1)+2N_{ID}+2^k n_{HARQ}) \mod 2^{31}$$

where $n_{HARQ}$ denotes the bit carrying the information of HARQ enabling or disabling, e.g., $n_{HARQ}=0$ when HARQ is disabled; and $n_{HARQ}=1$ when HARQ is enabled, vice versa. k is a predefined fixed integer, e.g., k=0; and $N_{ID}$ may be equal to or may be derived from the NR-G-RNTI; or $N_{ID} \in \{0, 1, \ldots, 65535\}$, which may be given by the higher-layer parameter groupcast-pdcch-DMRS-ScramblingID.

When a UE detects the PDCCH DMRS, the UE may determine whether HARQ is enabled or disabled for the scheduled groupcast transmission by the sequence of the received PDCCH DMRS.

Besides the DCI signaling, the transmission based HARQ enabling and disabling may also be indicated by the MAC-CE. This approach may be applied to the case that HARQ feedback may be needed for the groupcast transmissions within a period and HARQ feedback may not be needed for the groupcast transmissions within another period for the same groupcast service.

In this case, gNB may use MAC-CE to indicate the HARQ enabling and disabling information to the UEs. When a UE receives the MAC-CE, it may figure out if HARQ is enabled or disabled and perform the same behavior, e.g., send HARQ feedback for the groupcast transmissions; or do not send HARQ feedback for the groupcast transmissions, before receiving the next MAC-CE.

Hybrid HARQ Enabling and Disabling for Uu Groupcast

Figure 6:
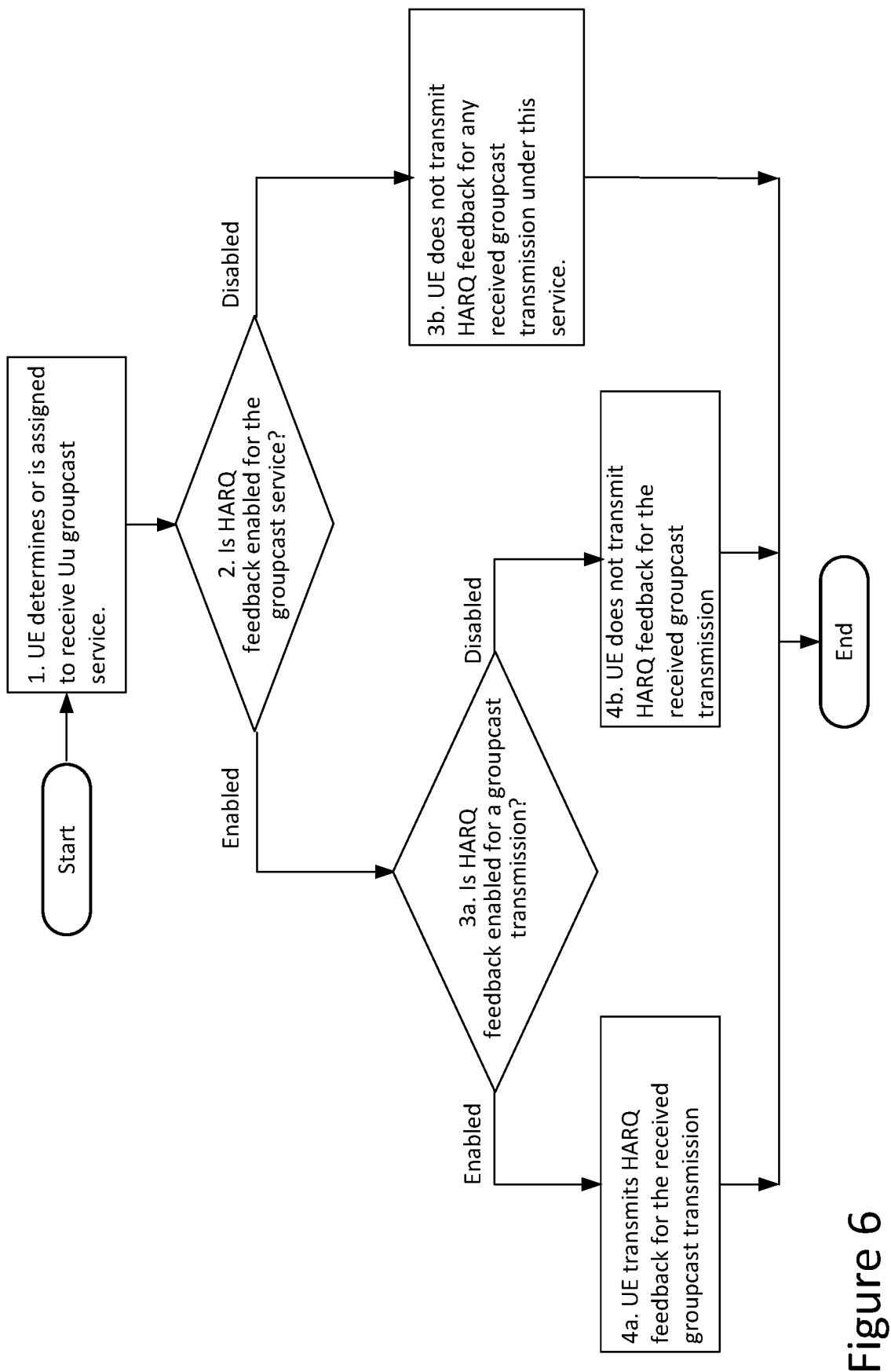
FIG. 6 shows an example method for hybrid HARQ enabling and disabling determination for Uu groupcast.

To take the advantages of these two schemes, an enhanced hybrid HARQ enabling and disabling determination mechanism which is a combination of the service based HARQ enabling/disabling and the transmission based HARQ enabling/disabling. A high-level overview of the flowchart of transmission based HARQ enabling and disabling determination for Uu groupcast is depicted in FIG. 6.

When a UE determines to receive or is assigned to receive a groupcast service, the UE may first check if HARQ is enabled or disabled for the groupcast service. If HARQ is disabled for the groupcast service, the UE determines it does not need to send HARQ feedback for any of the groupcast transmission under this groupcast service. If HARQ is enabled for the groupcast service, the UE may next check if HARQ is enabled or disabled for the groupcast transmission under the groupcast service. If HARQ is enabled for a or some groupcast transmission(s), the UE may send HARQ feedback for the groupcast transmission(s). If HARQ is disabled for a or some groupcast transmission(s), the UE may not send HARQ feedback for the groupcast transmission(s).

The schemes proposed for service based HARQ enabling/disabling and/or for transmission based HARQ enabling/disabling may also be applied here to hybrid HARQ enabling/disabling. For example, the hybrid indicating may be indicated through the RRC signaling and the DCI signaling; or through the RRC signaling and the MAC-CE signaling using the schemes proposed in this disclosure.

UE Based HARQ Enabling and Disabling for Uu Groupcast

Besides the groupcast service type and/or the groupcast transmission, the HARQ may be further enabled or disabled by certain condition(s) of the UE. For example, when the HARQ feedback is enabled for a groupcast transmission, a UE may decide if it will send the feedback based on certain condition(s).

This approach may be applicable to the case when the number of UEs receiving the groupcast transmission is large, and gNB does not expect all UEs in the group to feedback ACK/NACK; or may be applicable to the case when multiple UEs are allocated to send the feedback using the same time-frequency resource.

Such UE based HARQ enabling and disabling may be applied together with other HARQ enabling and disabling schemes proposed in this disclosure. A high-level overview of the flowchart of hybrid and UE based HARQ enabling and disabling determination for Uu groupcast is depicted in FIG. 7.

Figure 7:
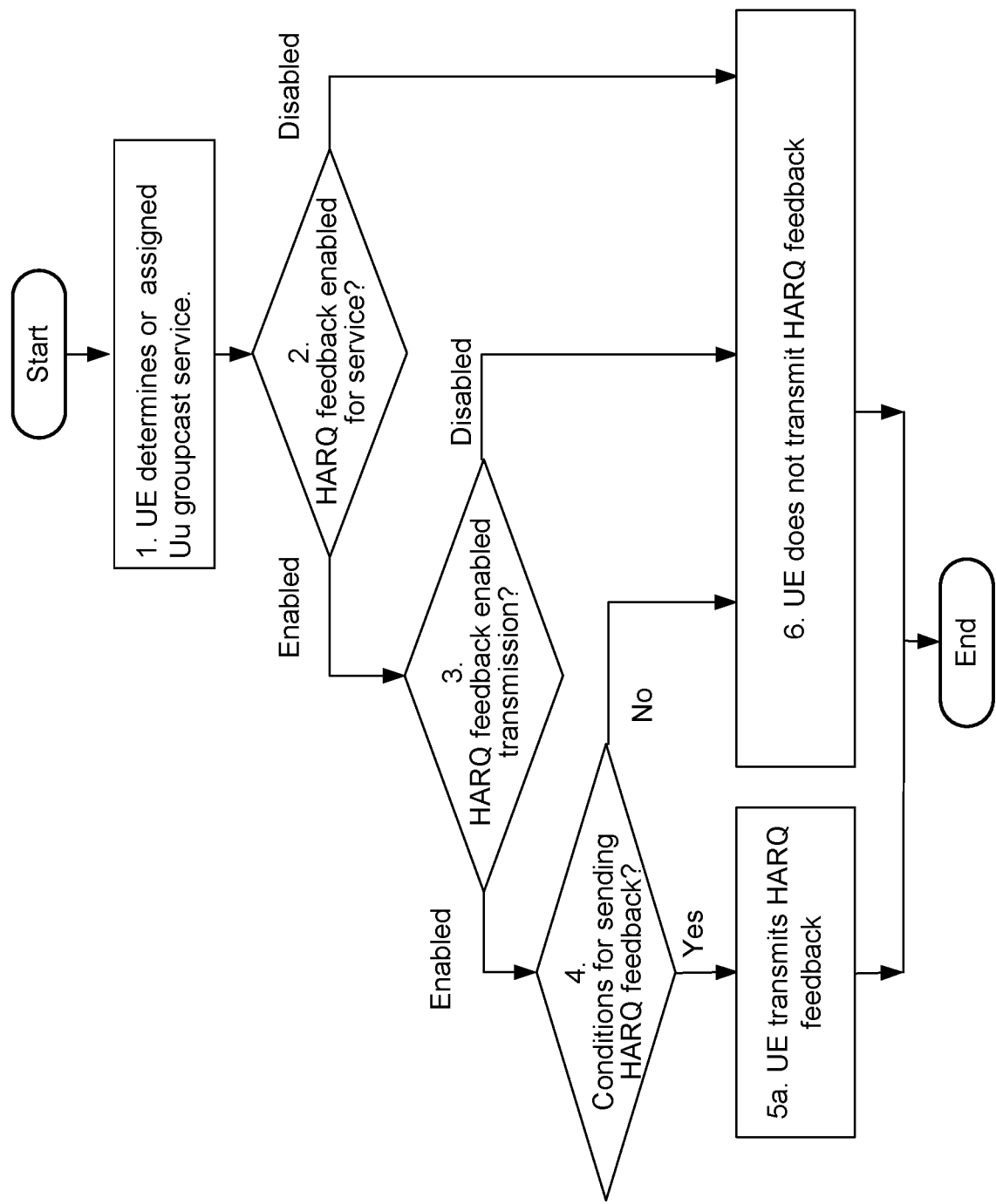
FIG. 7 shows an example method for hybrid and UE based HARQ enabling and disabling determination for Uu groupcast.

Referring to FIG. 7, in Step 1, a UE determines, or is assigned, to receive Uu groupcast service.

In step 2, the UE checks whether HARQ feedback is enabled or disabled for the groupcast service. If feedback is disabled, the UE proceeds to step 6 and does not transmit HARQ feedback for any received groupcast transmission.

If HARQ feedback is enabled for the groupcast service, then in step 3 the UE checks whether HARQ feedback enable is enabled for a groupcast transmission. If feedback is disabled, the UE proceeds to step 6 and does not transmit HARQ feedback for any received groupcast transmission.

If HARQ feedback is enabled for the groupcast transmission, then in step 4 the UE checks whether one or more conditions are met for HARQ feedback for the groupcast transmission. If conditions are not met, the UE proceeds to step 6 and does not transmit HARQ feedback for the received groupcast transmission.

If conditions are met, then in step 5 the UE transmits HARQ feedback for the received groupcast transmission.

When Uu based HARQ enabling and disabling scheme is worked together with other HARQ enabling and disabling scheme, e.g., hybrid scheme, the overall procedure follows the combined scheme, e.g., follows the hybrid scheme in this example, except that when the UE determines HARQ feedback is enabled for a groupcast transmission, the UE may further check if it passes the condition check to send the feedback. If it passes the condition check, the UE may send HARQ feedback for the received groupcast transmission; if it does not pass the condition check, the UE may not send HARQ feedback for the received groupcast transmission.

The Uu based HARQ enabling and disabling scheme may be also applied standalone, e.g., not combined with other HARQ enabling and disabling scheme. In this case, the UE may only need to do the condition check when receiving a groupcast transmission. The UE may send HARQ feedback if it passes the check, and it may not send HARQ feedback if it does not pass the check.

The condition check for determining whether a UE needs to send the HARQ feedback for a groupcast transmission or not may consist checking one or multiple of the following criteria:

Position Based HARQ Feedback for Uu Groupcast

The UE position may be a criterion used to determine if a UE need to send HARQ feedback for a groupcast transmission. For example, within a group of UEs receiving the groupcast transmission, while the UE(s) that are further away from the gNB are sending the HARQ feedback for a groupcast transmission, the UE(s) that are closer to the gNB may not need to send the HARQ feedback.

In this case, a UE may determine if it needs to send HARQ feedback to the gNB based on its distance from the gNB. For example, a threshold, e.g., $d_{threshold}$, may be indicated to the UEs. When the distance between a UE and the gNB is greater than the threshold $d_{threshold}$, the UE may determine it needs to send the HARQ feedback; when the distance between a UE and the gNB is less than the threshold $d_{threshold}$, the UE may determine it does not need to send the HARQ feedback for a groupcast transmission.

In one approach, the threshold $d_{threshold}$ may be statically configured by the gNB through RRC signaling. In one case, a common threshold may be configured and applied for all the groupcast services. Or, in another case, separate thresholds may be configured and applied for different groupcast services respectively, e.g., the information element NR_Uu_Groupcast_Config and configured together with the NR-G-RNTI with one to one mapping.

In another approach, the threshold $d_{threshold}$ may be indicated in a more flexible manner, e.g., indicated through DCI, or through MAC-CE. For example, a list of the candidate threshold values may be pre-configured by a table through RRC signaling. The scheduling DCI may carry a field indicating an index of the table to determine the threshold to be used for a groupcast grant. Similar idea can be applied for the MAC-CE based indicating as well.

Channel Quality Based HARQ Feedback for Uu Groupcast

The channel quality of the UE may be a criterion used to determine if a UE need to send HARQ feedback for a groupcast transmission. For example, within a group of UEs receiving the groupcast transmission, while the UE(s) that having worse channel quality are sending the HARQ feedback for a groupcast transmission, the UE(s) that having better channel quality may not need to send the HARQ feedback.

For example, a UE may determine if it needs to send HARQ feedback to the gNB based on its downlink channel quality, e.g., SS-RSRP (Reference Signal Received Power)

and/or CSI-RSRP. To support this, a threshold, e.g., $SSRSRP_{threshold}$ and/or $CSIRSRP_{threshold}$, may be indicated to the UEs. When the measured channel quality is lower than the threshold, the UE may determine it needs to send the HARQ feedback; when the measured channel quality is higher than the threshold, the UE may determine it does not need to send the HARQ feedback for a groupcast transmission.

And in it yet other examples, the determination on whether a UE needs to send HARQ feedback for a groupcast transmission may be based on other measurement quantities; e.g. RSRQ (Reference Signal Received Quality), RSSI (Received Signal Strength Indicator), SINR (Signal to Interference & Noise Ratio), pathloss, pathloss and fading, etc.

In one approach, the channel quality threshold may be statically configured by the gNB through RRC signaling. In one case, a common threshold may be configured and applied for all the groupcast services. Or, in another case, separate thresholds may be configured and applied for different groupcast services respectively. e.g., the information element NR_Uu_Groupcast_Config and configured together with the NR-G-RNTI with one to one mapping.

In another approach, the channel quality threshold may be indicated in a more flexible manner, e.g., indicated through DCI, or through MAC-CE. For example, a list of the candidate threshold values may be pre-configured by a table through RRC signaling. The scheduling DCI may carry a field indicating an index of the table to determine the threshold to be used for a groupcast grant. Similar idea can be applied for the MAC-CE based indicating as well.

Priority Based HARQ Feedback for Uu Groupcast

The priority of the UE may be a criterion used to determine if a UE need to send HARQ feedback for a groupcast transmission. For example, within a group of UEs receiving the groupcast transmission, different UEs may be allocated with different priorities. While the UE(s) with higher priority are sending the HARQ feedback for a groupcast transmission, the UE(s) with lower priority may not need to send the HARQ feedback.

In this case, a UE may determine if it needs to send HARQ feedback to the gNB by comparing its own priority with a priority threshold. For example, a priority threshold, e.g., $P_{threshold}$, may be indicated to the UEs. When a UE's allocated priority is higher than the threshold $P_{threshold}$, the UE may determine it needs to send the HARQ feedback; when a UE's allocated priority is lower than the threshold $P_{threshold}$, the UE may determine it does not need to send the HARQ feedback for a groupcast transmission.

In one approach, the threshold $P_{threshold}$ may be statically configured by the gNB through RRC signaling. In one case, a common threshold may be configured and applied for all the groupcast services. Or, in another case, separate thresholds may be configured and applied for different groupcast services respectively, e.g., the information element NR_Uu_Groupcast_Config and configured together with the NR-G-RNTI with one to one mapping.

In another approach, the threshold $P_{threshold}$ may be indicated in a more flexible manner, e.g., indicated through DCI, or through MAC-CE. For example, a list of the candidate threshold values may be pre-configured by a table through RRC signaling. The scheduling DCI may carry a field indicating an index of the table to determine the threshold to be used for a groupcast grant. Similar idea can be applied for the MAC-CE based indicating as well.

HARQ Feedback for Uu Groupcast

When HARQ feedback is enabled for a groupcast transmission or broadcast transmission, gNB need to indicate the UEs the resources to be used for sending the HARQ feedback. In this subsection, we provide various solutions on resource allocation for Uu groupcast HARQ feedback. In the following we use groupcast service as the example. However, the disclosed solutions may be also applied to broadcast service.

ACK-NACK Based Uu Groupcast HARQ Feedback.

Regarding the HARQ feedback, a typical approach is if a UE successfully decodes the received transmission, the UE will send HARQ-ACK on the allocated PUCCH (Physical Uplink Control Channel); if a UE fails to decode the received transmission, the UE will send HARQ-NACK on the allocated resource.

In NR Uu groupcast, this approach may be also applied. However, since multiple UEs may need to send HARQ feedback to the gNB for one groupcast transmission, when gNB schedules a groupcast transmission, the gNB need to allocate multiple resources to different UEs. For example, each UE may be allocated with a dedicated resource for sending ACK or NACK. Or gNB may allocate multiple resources for sending HARQ feedback for one groupcast transmission, where each resource may be allocated to multiple UEs.

The gNB may determine the feedback from the UEs by detecting the information received on the allocated resources. In some scenarios, a UE may be allocated with multiple HARQ feedback resources for different groupcast transmissions within the same slot. For example, a UE is allocated with two HARQ feedback resources for two groupcast transmissions respectively within the same slot. In this case, in one example, the UE may transmit the HARQ feedback for the two groupcast transmissions on the two allocated resources respectively and does not perform HARQ multiplexing. In yet another example, the UE may multiplex the HARQ bits and send the feedback on one of the allocated PUCCH resources, e.g., transmit the multiplexed HARQ bits on the PUCCH scheduled by the most recent DCI. When the UE generating the multiplexed HARQ bits, the UE may put the HARQ feedback for the earlier transmission in the more significant bit, e.g., put the HARQ feedback for the earliest transmission in the MSB (Most Significant Bit) and put the HARQ feedback for the most recent transmission in the LSB (Least Significant Bit).

To allocate the resources, the following the resource allocation schemes may be applied:

Explicit Dedicated Resource Allocation

Dedicated DCI fields in the Uu groupcast scheduling DCI, e.g., PUCCH resource indicator field_1, PUC CH resource indicator field_2, . . . , PUCCH resource indicator field_n, may be used to separately indicate the resources used by n UEs or n groups of UEs for sending the ACK and NACK feedback respectively.

The gNB may pre-configure n UEs or n group of UEs to send the HARQ feedback, e.g., the UEs need to send HARQ feedback may be configured with HARQ feedback group ID, which may have one to one mapping with the PUCCH resource indicator field in the DCI. For example, the UE configured with the HARQ feedback group ID, e.g., HARQ feedback group ID=3, may send HARQ feedback on the resource scheduled by the corresponding DC field, e.g., the resource indicated by the PUCCH resource indicator field_3 in the scheduling DCI.

The gNB may pre-configure k UEs or k group of UEs, where k>n, as the candidates to send the HARQ feedback. The gNB may transmit a k-bits bitmap in the scheduling DCI, e.g., using DCI field HARQ feedback group indicator field, to indicate which UEs or which groups of UEs need to send HARQ feedback for the scheduled transmission. For example, assume k=4 and the HARQ feedback group indicator field is indicated as '1101', then the UEs configured with HARQ feedback group ID=1, or 2, or 4 need to send the HARQ feedback.

In one case, gNB may always transmit k DCI fields for HARQ feedback resource allocation, e.g., PUCCH resource indicator field_1, PUCCH resource indicator field_2, . . . , PUCCH resource indicator field_k, in the scheduling DCI. In another case, gNB may only transmit the DCI fields for the groups indicated in the bitmap. Using the previous example, if group 1, group 2 and group 4 are indicated in the bitmap, then the scheduling DCI may only carry the DCI fields PUCCH resource indicator field_1, PUCCH resource indicator field_2, and PUCCH resource indicator field_4, but not carrying the DCI field PUCCH resource indicator field_3.

For example, the PUCCH resource indicator field values may map to values of a set of PUCCH resource indexes provided by RRC signaling, e.g., GoupcastResourceList, for PUCCH resources from a set of PUCCH resources provided by RRC signaling, e.g., PUCCH-ResourceSet or Groupcast-PUCCH-ResourceSet.

Joint Resource Allocation with Implicit Resource Determination for Different UEs or UE Groups One DCI field in the Uu groupcast scheduling DCI, e.g., PUCCH resource indicator field, may be used to jointly indicate the resources used by n UEs or n groups of UEs for sending the ACK and NACK feedback.

For example, the PUCCH resource indicator field values may map to values of a set of PUCCH resource indexes provided by RRC signaling, e.g., GoupcastResourceList, for PUCCH resources from a set of PUCCH resources provided by RRC signaling, e.g., PUCCH-ResourceSet or Groupcast-PUCCH-ResourceSet. In this approach, one allocated PUCCH resource may contain the resources used by n UEs or n groups of UEs for sending the ACK and NACK feedback.

Once a UE determines the allocated PUCCH resource, the UE may figure out the resources used by each UE or UE group by dividing the allocated resource into n parts using some pre-defined rules. For example, the allocated PUCCH resource may be evenly divided, e.g., in frequency domain; or in time domain: or in both time domain and frequency domain, into n parts, where the first part is used by the $1^{st}$ UE or the UEs in the $1^{st}$ group for sending the HARQ feedback; and the second part is used by the $2^{nd}$ UE or the UEs in the $2^{nd}$ group for sending the HARQ feedback, and etc.

In one case, the value of n may be fixed and may be pre-configured through the RRC signaling. In another case, the value of n may vary in different groupcast transmissions and may be dynamically indicated in the scheduling DCI. For example, gNB may pre-configure k UEs or k group of UEs as the candidates to send the HARQ feedback. The gNB may transmit a k-bits bitmap to indicate which UEs or which groups of UEs need to send HARQ feedback for the scheduled transmission. In the same time, the UE may determine the value of n using the indicated bitmap.

Joint Resource Allocation with Explicit Resource Determination for Different UEs or UE Groups One DCI field in the Uu groupcast scheduling DCI, e.g., PUCCH resource indicator field, may be used to jointly indicate the resources used by n UEs or n groups of UEs for sending the ACK and NACK feedback.

For example, the PUCCH resource indicator field values may map to values of a set of PUCCH resource indexes provided by RRC signaling, e.g., GoupcastResourceList, for PUCCH resources from a set of PUCCH resources provided by RRC signaling, e.g., PUCCH-ResourceSet or Groupcast-PUCCH-ResourceSet. In this approach, one allocated PUCCH resource may contain the resources used by n UEs or n groups of UEs for sending the ACK and NACK feedback.

Instead of that the UE implicitly determining the resources by dividing the allocated PUCCH resource into n parts using pre-defined rules, the resources used by the n UEs or n groups of UEs may be explicitly configured by the RRC signaling. For example, each PUCCH resource configured in the RRC configuration, e.g., GoupcastResourceList, may contain n parts, where each part is used by a UE or a group of UEs for sending the ACK or NACK feedback respectively.

The mechanism proposed above for determining the value of n may be also applied here. In the case of bitmap-based approach, each PUCCH resource configured in the RRC configuration may contain k parts. The n UEs or n groups of UEs indicated by the bitmap may figure out their resources to be used from the k resources, e.g., using the first n out of the k resources; or using the last n out of the k resources; or using the resources with the same indexes from the k resources, etc.

NACK Only Based Uu Groupcast HARQ feedback.

Since applying the ACK-NACK based Uu groupcast HARQ feedback for Uu groupcast transmission may have challenges on its high scheduling complexity, high signaling overhead due to different resources need to be allocated to different UEs to send the feedback, etc., NACK only based HARQ feedback scheme may be adopted for NR Uu Groupcast.

In NACK only based HARQ feedback scheme, for the UEs that need to send the HARQ feedback, if a UE fails to decode the received transmission, the UE will send HARQ-NACK on the allocated PUCCH; if a UE successfully decodes the received transmission, the UE will not transmission signal on the on the allocated resource.

In this approach, the same time-frequency resource may be shared by multiple UEs to send the HARQ feedback, or in another word, gNB may allocate the same resource to all the UEs that need to send HARQ feedback for one groupcast transmission.

The gNB may determine the feedback from the UEs by detecting the power received on the allocated resources. In some scenarios, a UE may be allocated with multiple HARQ feedback resources for different groupcast transmissions within the same slot. For example, a UE is allocated with two HARQ feedback resources for two groupcast transmissions respectively within the same slot. In this case, the UE may transmit the HARQ feedback for the two groupcast transmissions on the two allocated resources respectively and does not perform HARQ multiplexing. The UE is not expected to be indicated by the gNB to send the HARQ feedback for the two groupcast transmissions on the same time-frequency resource.

To allocate the feedback resource to the receiving UE, a DCI field in the Uu groupcast scheduling DCI, e.g., PUCCH resource indicator field, may be used to indicate the resources used for sending the NACK feedback.

For example, the PUCCH resource indicator field values may map to values of a set of PUCCH resource indexes provided by RRC signaling, e.g., GoupcastResourceList, for PUCCH resources from a set of PUCCH resources provided by RRC signaling, e.g., PUCCH-ResourceSet or Groupcast-PUCCH-ResourceSet.

A DCI field in the Uu groupcast scheduling DCI, e.g., PDSCH-to-HARQ feedback timing indicator, may be used to indicate the time offset between the groupcast transmission and the allocated HARQ feedback resource.

Enhanced ACK-NACK Based Uri Groupcast HARQ Feedback.

NACK only based HARQ feedback scheme may have advantages on its low signaling overhead, etc. However, it may be risky in the case when all the UEs missed the scheduling DCI for the groupcast transmission, e.g., due to bad channel condition. In this case, although the groupcast transmission is not succeeded, no receiving UE will send NACK on the allocated resource since they even didn't decode the DCI. Then the gNB may misinterpret that the transmission is succeeded since not NACK is received. As a consequence, it may cause issues to the system.

To solve this issue, an enhanced ACK-NACK based HARQ feedback scheme for NR Uu groupcast. In the enhanced ACK-NACK based HARQ feedback scheme, the gNB may allocate two time-frequency resources for receiving UEs to send HARQ-ACK and HARQ-NACK respectively. The allocated resources may be shared by all the UEs to send ACK and NACK respectively. In this scheme, for the UEs that need to send the HARQ feedback, if a UE successfully decodes the received transmission, the UE will send HARQ-ACK on the allocated PUCCH; if a UE fails to decode the received transmission, the UE will send HARQ-NACK on the allocated resource. For the UEs that need to send the HARQ feedback, all the UEs that successfully decodes the transmission may send ACK on the same allocated time-frequency resource; and all the UEs that fails to decode the transmission may send NACK on the same allocated time-frequency resource, which may be different from the resource used for sending ACK.

The gNB may determine the feedback from the UEs by detecting the power received on the allocated resources. In some scenarios, a UE may be allocated with multiple HARQ feedback resources for different groupcast transmissions within the same slot. For example, a UE is allocated with two HARQ feedback resources for two groupcast transmissions respectively within the same slot. In this case, the UE may transmit the HARQ feedback for the two groupcast transmissions on the allocated resources respectively and does not perform HARQ multiplexing. The UE is not expected to be indicated by the gNB to send the HARQ feedback for the two groupcast transmissions on the same time-frequency resource.

Using this scheme, when the scheduling DCI is missed by all the UEs, the gNB will receive no signaling on the two allocated resources. Then the gNB may determine the groupcast transmission is failed and conduct the consequent procedures, e.g., perform retransmission.

To allocate the resources used for sending the ACK and NACK feedback, the following the resource allocation schemes may be applied:

Joint Resource Allocation with Implicit Resource Determination for ACK and NACK Feedback One DCI field in the Uu groupcast scheduling DCI, e.g., PUCCH resource indicator field, may be used to jointly indicate the resources used for sending the ACK and NACK feedback.

For example, the PUCCH resource indicator field values may map to values of a set of PUCCH resource indexes provided by RRC signaling, e.g., GoupcastResourceList, for PUCCH resources from a set of PUCCH resources provided by RRC signaling. e.g., PUCCH-ResourceSet or Groupcast-PUCCH-ResourceSet.

Once a UE determines the allocated PUCCH resource, the UE may figure out the resources used for sending ACK and NACK feedback respectively by dividing the allocated resource into two parts using some pre-defined rules. For example, the allocated PUCCH resource may be evenly divided, e.g., in frequency domain; or in time domain, into two parts, where the first part is used by the UEs sending the ACK feedback and the second part is used by the UEs sending the NACK feedback, vice versa.

Joint Resource Allocation with Explicit Resource Determination for ACK and NACK Feedback One DCI field in the Uu groupcast scheduling DCI, e.g., PUCCH resource indicator field, may be used to jointly indicate the resources used for sending the ACK and NACK feedback.

For example, the PUCCH resource indicator field values may map to values of a set of PUCCH resource indexes provided by RRC signaling, e.g., GoupcastResourceList, for PUCCH resources from a set of PUCCH resources provided by RRC signaling, e.g., PUCCH-ResourceSet or GroupcastPUCCH-ResourceSet.

Instead of that the UE implicitly determining the resources by dividing the allocated PUCCH resource into two parts using pre-defined rules, the resources used for sending the ACK and NACK feedback may be explicitly configured by the RRC signaling. For example, each PUCCH resource configured in the RRC configuration, e.g., GoupcastResourceList, may contain two parts, where each part is used for sending the ACK or NACK feedback respectively.

Explicit Dedicate Resource Allocation

Two DCI fields in the Uu groupcast scheduling DCI, e.g., PUCCH resource for ACK indicator field and PUCCH resource for NACK indicator field, may be used to separately indicate the resources used for sending the ACK and NACK feedback respectively.

The PUCCH resource for ACK indicator field values may map to values of a set of PUCCH resource indexes provided by RRC signaling, e.g., GoupcastResourceList, for PUCCH resources from a set of PUCCH resources provided by RRC signaling, e.g., PUCCH-ResourceSet or GroupcastPUCCH-ResourceSet.

The PUCCH resource for NACK indicator field values may map to values of a set of PUCCH resource indexes provided by RRC signaling, e.g., GoupcastResourceList, for PUCCH resources from a set of PUCCH resources provided by RRC signaling, e.g., PUCCH-ResourceSet or Groupcast-PUCCH-ResourceSet.

When the two resources for sending the ACK and NACK feedback are separately indicated, the two resources may be allocated in the same slot or in different slots. The time offset between the groupcast transmission and the allocated two HARQ feedback resources may be indicated through the same DCI field, e.g., PDSCH-to-HARQ_feedback timing indicator, in the groupcast scheduling DCI. Or, to support more flexible feedback resource allocation, two dedicated DCI fields, e.g., PDSCH-to-HARQ_ACK_feedback timing indicator and PDSCH-to-HARQ_NACK_feedback timing indicator, may be carried by the groupcast scheduling DCI to indicate the time offsets for the two allocated feedback resources separately.

The proposed enhanced ACK-NACK based HARQ feedback scheme may be also applied to the sidelink groupcast transmission, e.g., by replacing gNB by Tx UE; replacing UE by Rx UE; replacing DCI by SCI (Sidelink Control Information); replacing PUCCH by PSFCH (Physical Sidelink Feedback Channel), etc.

Collision Handling Between HARQ Feedback for Uu Groupcast/Broadcast and Other Transmission.

In NR, a UE may need to support simultaneous operation of broadcast/groupcast reception via Uu interface and other transmission(s), e.g., unicast transmission and reception via Uu interface, sidelink transmission via PC5 interface. In some cases, the transmission of HARQ feedback for broadcast/groupcast via Uu interface may overlap with other uplink or sidelink transmissions, e.g., unicast PUCCH transmission and unicast PUSCH transmission via Uu interface, sidelink feedback via Uu interface or sidelink PSSCH transmission via PC5 interface, etc. Described herein are methods for collision handling between HARQ feedback for Uu broadcast/groupcast and other transmissions.

For the sake of simplicity, in the rest of this application, the HARQ feedback for Uu broadcast/groupcast downlink transmission is referred as GC HARQ feedback: the HARQ feedback for Uu unicast downlink transmission is referred as UC HARQ feedback: the sidelink HARQ feedback sent to the gNB is referred as SL HARQ feedback on Uu.

Note that the collision handling methods proposed herein may apply to any HARQ feedback mechanism for groupcast/broadcast, including but not limited to the ACK-NACK based Uu groupcast HARQ feedback mechanism, the NACK only based Uu groupcast HARQ feedback mechanism, and the enhanced ACK-NACK based Uu groupcast HARQ feedback mechanism proposed in this application.

Collision Handling Between GC HARQ Feedback and Other HARQ Feedback Transmitted on PUCCH for Unicast or for Sidelink.

In NR, when a UE is scheduled with unicast downlink transmission, the UE will send HARQ feedback to the gNB. The HARQ feedback is transmitted in the PUCCH resource indicated in the scheduling DCI, e.g., DCI format 1_0, DCI format 1_1 and DCI format 1_2. When a UE is operating in NR V2X mode 1, the UE may also send the sidelink HARQ feedback to the gNB through the PUCCH indicated by the DCI scheduling the sidelink transmission, e.g., DCI format 3_0 and DCI format 3_1.

As proposed in the previous sections, the UE may also send the GC HARQ feedback in the PUCCH. The scheduled PUCCH resource used for GC HARQ feedback transmission may overlap, e.g., fully overlap, partially overlap, etc., with the PUCCH resource scheduled for other HARQ feedback transmission in time, e.g., UC HARQ feedback, SL HARQ feedback on Uu, etc. In such cases, collision may occur. To avoid the collisions, one approach is that the GC HARQ feedback, the UC HARQ feedback, and the SL HARQ feedback on Uu may not be allowed to be scheduled at the same time in the same slot.

However, such restriction may limit the network scheduling flexibility and reduce the spectrum efficiency. Therefore, it may be preferable not to introduce such restriction or relax such restriction and solve the collision issue through prioritization procedures proposed below.

When there is collision between the PUCCH for GC HARQ feedback and the PUCCH for UC HARQ feedback or for SL HARQ feedback on Uu, one of the HARQ feedback transmission may be dropped. In one case, the dropping rule(s) may be predefined. For example, when the PUCCH for GC HARQ feedback collides with the PUCCH for UC HARQ feedback or collides with the PUCCH for SL HARQ feedback on Uu, the transmission of GC HARQ feedback may always be deprioritized and dropped; or the transmission of GC HARQ feedback may be always prioritized, e.g., the transmission of UC HARQ feedback or SL HARQ feedback on Uu is dropped.

In another example, the PUCCH for GC HARQ feedback may collide with both the PUCCH for UC HARQ feedback and the PUCCH for SL HARQ feedback on Uu. In this case, the GC HARQ feedback may be always deprioritized and dropped while the UC HARQ feedback and the SL HARQ feedback on Uu may be multiplexed and transmitted; or the GC HARQ feedback may always be prioritized and the rest HARQs are dropped.

As NR supports traffic with different QoS requirements, e.g., latency, reliability, etc., the transmissions may have different priorities. When the collision happens, the dropping rule(s) may vary case by case. Therefore, the following priority-based prioritization rules may be implemented.

In a first approach of priority-based prioritization rule, a UE may compare the priority levels between the colliding transmissions. The transmission with higher priority is prioritized. For example, a UE may be configured or indicated with the priority of the groupcast transmission and sidelink transmission. When there is collision between PUCCH for GC HARQ feedback and PUCCH for SL HARQ feedback on Uu, the UE may compare the priority values associated with the groupcast transmission and the sidelink transmission where the transmission with lower priority value is prioritized, e.g., the lower the priority value is the higher priority the transmission has. When the UE determines that the two transmissions have the equal priority, the UE may perform the prioritization based on the predefined rules aforementioned, e.g., always prioritized one transmission over the other one.

In NR, unicast transmissions are categorized into two priority levels, e.g., high priority and low priority, through the priority index field in the scheduling DCI. In a second approach, the UE may perform prioritization using the following rules when there is collision between the GC HARQ feedback and the UL transmission associated with a unicast transmission, e.g., UCI transmission on PUCCH, PUSCH transmission, etc. When the unicast transmission has high priority, e.g., the priority index in the associated DCI or associated configured grant is '1', the unicast transmission is always prioritized, and the GC HARQ feedback is deprioritized. Meanwhile, the UE may be configured with a priority threshold for groupcast, e.g., GC_priority_threshold. When the unicast transmission has low priority, e.g., the priority index in the associated DCI or associated configured grant is '0', if the priority of the GC HARQ feedback is higher than the threshold, e.g., the priority value of the associated groupcast transmission is smaller than the GC_priority_threshold, the GC HARQ feedback is prioritized and the unicast transmission is deprioritized; otherwise the unicast transmission is prioritized and the GC HARQ feedback is deprioritized.

As another alternative, a third approach of priority-based prioritization rule may be as follows. When the unicast transmission has low priority, the GC HARQ feedback is always prioritized, and the unicast transmission is deprioritized. When the unicast transmission has high priority, if the priority of the GC HARQ feedback is higher than the threshold, the GC HARQ feedback is prioritized, and the unicast transmission is deprioritized; otherwise the unicast transmission is prioritized, and the GC HARQ feedback is deprioritized.

Furthermore, in a fourth approach, a UE may be configured with two GC priority thresholds, e.g., GC_priority_threshold_high and GC_priority_threshold_low, where one threshold is used when the unicast transmission has high priority and the other one is used when the unicast transmission has low priority. For example, when the unicast transmission has high priority, the UE may compare the priority of the groupcast transmission with the threshold GC_priority_threshold_high. If the priority is higher than the threshold, the GC HARQ feedback is prioritized, and the unicast transmission is deprioritized; otherwise the unicast transmission is prioritized, and the GC HARQ feedback is deprioritized. When the unicast transmission has low priority, the UE may perform the prioritization by applying the same rule as it is used for high priority with GC_priority_threshold_low used.

In some scenarios, there may be more than one GC HARQ feedbacks, e.g., multiple GC HARQ feedbacks transmitted in one codebook, overlapped with other transmission(s). The GC HARQ feedbacks may be associated with different groupcast transmissions that have different priorities. In this case, the highest priority, e.g., the smallest priority value, among the overlapped GC HARQ feedbacks may be used for the priority-based prioritization. Alternatively, the lowest priority among the overlapped GC HARQ feedbacks may be used.

When there is collision between the PUCCH for GC HARQ feedback and the PUCCH for UC HARQ feedback or for SL HARQ feedback on Uu, the UE may apply the priority-based prioritization rule to determine which transmission to drop, e.g., the prioritized transmission will be transmitted and the deprioritized transmission will be dropped.

When the collision happens, besides directly dropping one of the transmissions, the UE may multiplex the HARQ feedbacks and transmit the multiplexed information in one of the collided PUCCH resource. Such behavior may be predefined, e.g., when there is collision between the PUCCH for GC HARQ feedback and the PUCCH for other HARQ feedback, the UE may always perform the multiplexing.

Or, the multiplexing may be performed based on the priority of the GC HARQ feedback. For example, the UE may apply the priority-based prioritization rule to determine whether the multiplexing is performed or not. In one alternative, the UE may drop the GC HARQ feedback transmission when it is deprioritized, and the UE may multiplex the GC HARQ feedback transmission with other HARQ feedbacks when it is prioritized. In another alternative, the UE may multiplex the GC HARQ feedback transmission with other HARQ feedbacks when it is deprioritized, and the UE may drop the transmission of other HARQ feedbacks when the GC HARQ feedback is prioritized.

When the UE multiplexes the HARQ feedbacks, the multiplexed HARQ information bits may be jointly encoded. For example, a common codebook, e.g., type-1 codebook, type-2 codebook, type-3 codebook, may be used for the UE to convey the GC HARQ feedback and the other collided HARQ feedbacks. Or, a new type of codebook with larger length may be introduced for multiplexing multiple HARQ feedback results jointly. Alternatively, that the multiplexed HARQ information bits may be separately encoded and then concatenated. For example, the UE may first generate the GC HARQ feedback and the other collided HARQ feedbacks using separate codebooks. Then the generated codebooks may be concatenated and transmitted in the allocated PUCCH resource.

When separate codebooks are used, in one approach, the UE may only multiplex the HARQ feedbacks using the same type of codebook. For example, when a GC HARQ feedback using type-1 codebook collides with a UC HARQ feedback using type-1 codebook, the UE may multiplex the two HARQ feedback codebooks and transmitted in the PUCCH. However, when the two collided HARQ feedbacks are using different codebooks, e.g., one uses type-1 codebook and the other one uses type-2 codebook, the UE might not perform the multiplexing and drop the transmission of one HARQ feedback where the dropping may be based on the predefined rules or may be based on the priority-based prioritization as proposed in previous. In another approach, the UE may multiplex the HARQ feedbacks when they are using the same type of codebook and when they are using different types of codebook.

While the codebooks are concatenated, the order of the multiplexed codebooks needs to be defined to avoid the ambiguity between the UE and gNB. The concatenation order may be predefined. For example, the codebooks may be multiplexed in the order of UC HARQ feedback (if included), SL HARQ feedback on Uu (if included), and GC HARQ feedback. Alternatively, the codebooks may be multiplexed in the order of UC HARQ feedback (if included), GC HARQ feedback, and SL HARQ feedback on Uu (if included); or in the order of GC HARQ feedback, UC HARQ feedback (if included), and SL HARQ feedback on Uu (if included). In another example, the codebooks may be multiplexed in the order of SL HARQ feedback on Uu (if included), UC HARQ feedback (if included), and GC HARQ feedback or in the order of SL HARQ feedback on Uu (if included), GC HARQ feedback and UC HARQ feedback (if included). In another approach, the concatenation order may be based on the priority of the HARQ feedback. For example, the codebook with the higher priority may be multiplexed first and the codebook with the lower priority may be multiplexed next.

When there is collision between GC HARQ feedback and other HARQ feedback, the UE is originally allocated with the different PUCCH resources used for sending the feedback respectively. If multiplexing is performed, the UE may transmit the multiplexed HARQ feedbacks in one of the allocated PUCCH resources.

The next earliest PUCCH resource that meets the minimum processing timeline may be used for transmitting the multiplexed HARQ feedbacks. Here, the next earliest PUCCH resource may be originally allocated for the GC HARQ feedback or may be allocated for UC HARQ feedback or SL HARQ feedback on Uu. Or the latest PUCCH resource among the collided PUCCH resources allocated by the gNB that meets the minimum processing timeline may be used.

Or, the next earliest PUCCH resource, which is allocated for the UC HARQ feedback or SL HARQ feedback on Uu and meets the minimum processing timeline, may be used for transmitting the multiplexed HARQ feedbacks. In another word, if the next earliest PUCCH resource is allocated for GC HARQ feedback, then it is not selected to transmit the multiplexed HARQ feedback. Or, the latest PUCCH resource among the collided PUCCH resources, which is allocated for the UC HARQ feedback or SL HARQ feedback on Uu and meets the minimum processing timeline, may be used.

When NACK only based groupcast HARQ feedback mechanism is used, a UE will not send feedback to gNB if it successfully receives the transmission. Meanwhile, if the PUCCH resource allocated for sending the NACK feedback overlaps with the PUCCH resource for UC HARQ feedback, in one approach, the UE may follow the NACK only based groupcast HARQ feedback behavior, e.g., the UE will not send feedback for the groupcast transmission while the UE will use the allocated PUCCH resource for UC HARQ feedback to send the UC HARQ feedback only. In another approach, in this case, the UE may send ACK to the gNB for the groupcast transmission. The UE may multiplex the GC ACK feedback with the UC HARQ feedback, and transmit the multiplexed HARQ feedbacks in the PUCCH resource allocated for UC HARQ feedback. By doing this, it can let the gNB know the groupcast transmission is ACK-ed by the UE, therefore reducing the issue caused by UEs missing the groupcast scheduling DCI. The idea proposed here may also be applied to the case when the collision is between the GC HARQ feedback and other UC UCIs transmitted in PUCCH, and to the case when the collision is between the GC HARQ feedback and unicast physical uplink shared channel (PUSCH).

Collision Handling Between GC HARQ Feedback and Other UCIs Transmitted on PUCCH for Unicast or for Sidelink.

Besides colliding with the PUCCH for UC HARQ feedback or SL HARQ feedback on Uu, the PUCCH resource for GC HARQ feedback may also collide with the PUCCH resource allocated for other uplink control information (UCIs), e.g., scheduling request (SR) for a unicast transmission, SR for a sidelink transmission, CSI reporting, etc. When such collision happens, the following methods to handle it.

In one method, the UE may only transmit one of the colliding transmissions while the other transmissions are dropped. For example, when a PUCCH resource for GC HARQ feedback collides with a PUCCH resource for SR, the UE may only transmit SR and drop the transmission of GC HARQ feedback. Or the UE may only transmit the GC HARQ feedback and drop the transmission of SR. Similar idea may also be applied to the case when PUCCH resource for GC HARQ feedback collides with PUCCH resource for CSI. In another example, the UE may perform the dropping using the priority-based prioritization here, e.g., the UE may only transmit the prioritized transmission and drop the deprioritized transmission.

In another method, the UE may multiplex the GC HARQ feedback with other UCIs and transmit the multiplexed information bits in the PUCCH allocated for UCI transmission. In one approach, the UE may always perform the multiplexing when the collision happens. Or, in another approach, the UE may apply the priority-based prioritization to do the multiplexing using the similar principle proposed for multiplexing between the GC HARQ feedback and other HARQ feedbacks.

When the UE performs the multiplexing, the UE may multiplex the information bits according to the following alternatives. In a first alternative, the UE may map all the HARQ feedbacks first, e.g., GC HARQ feedback, UC HARQ feedback, SL HARQ feedback on Uu, etc., and then the SR and the CSI are appended after the HARQ to the PUCCH resource allocated for UCI transmission.

In a second alternative, the UE may map all the unicast and sidelink UCI first, e.g., UL and SL HARQ, SR, CSI, and then the GC HARQ feedback is appended next.

In a third alternative, the UE may map the GC HARQ feedback first, and the unicast and sidelink UCI is appended after the GC HARQ feedback.

In a fourth alternative, the multiplexing order may be based on the prioritization, e.g., the transmission with higher priority is mapped first, and the transmission with lower priority is appended next.

In some cases, the total number of the multiplexed bits may exceed the maximum payload size of the PUCCH resource set can carry. In this scenario, certain information needs to be dropped. In this case, the UE may always drop the CSI reporting first. Alternatively, the UE may always drop the GC HARQ feedback and SL HARQ feedback on Uu (if existing) first. Or, in another alternative, the dropping may be based on the prioritization, e.g., the transmission with lower priority is dropped first. Or, aperiodic PUSCH-based feedback may be used for accommodating the large payload. Or, a new PUCCH format, e.g., PUCCH format 6, which can carry more information bits may be introduced to accommodate the large payload.

Collision Handling Between GC HARQ Feedback and Unicast PUSCH Transmission.

In another scenario, the PUCCH resource for GC HARQ feedback may collide with a unicast PUSCH transmission. The PUSCH may be a PUSCH carrying UL data, or a PUSCH carrying UC UCI. The PUSCH may be dynamically scheduled by the DCI or may be transmission using a configured grant resource. In this case, the UE may multiplex the GC HARQ feedback in the PUSCH and transmit them together. In an example, the UE may always perform the multiplexing when such collision happens. Or, the UE may adopt the priority-based prioritization, e.g., if the GC HARQ feedback is prioritized, the UE multiplexes the GC HARQ feedback in the PUSCH; if the GC HARQ feedback is deprioritized, the UE drops the transmission of the GC HARQ feedback.

In NR, when a UE multiplexes the UC HARQ feedback in the PUSCH, the UE uses the $\beta_{offset}$ to determine the resources to be used for piggybacking. The value of the $\beta_{offset}$ can be semi-statically configured by the gNB using the RRC configuration betaOffsets or it can be dynamically signaled by the scheduling DCI using the beta_offset indicator field.

When a UE multiplexes the GC HARQ feedback in the PUSCH, the UE needs to know how many resources are used for piggybacking the GC HARQ feedback. To determine such information, both semi-statically configuring and dynamical signaling may be supported.

For semi-statically configuring, in one approach, the UE may reuse the value of $\beta_{offset}$ configured for UC HARQ piggybacking when it performs the GC HARQ piggybacking. In another word, the UE uses the same value to calculate the resources used for GC HARQ and the resources for UC HARQ.

In another approach, the UE may be configured a separate $\beta_{offset}$ value for GC HARQ piggybacking. An example is depicted in Code Example 4 of the Appendix. The betaOffsetACKforGroupcast-Index1, betaOffsetACKforGroupcast-Index2, and betaOffsetACKforGroupcast-Index3 respectively provide the $\beta_{offset}$ values for the UE to use if the UE multiplexes up to 2 GC HARQ information bits, more than 2 and up to 11 GC HARQ information bits, and more than 11 bits in the PUSCH, respectively.

Another example is depicted in Code Example 5 of the Appendix where a new RRC information element, e.g., BetaOffsetsforGroupcast IE, may be introduced for configured the $\beta_{offset}$ value for GC HARQ piggybacking. In this case, when a UE is configured with the UE specific PUSCH parameters or the uplink transmission without dynamic grant, the UE may be configured with both the BetaOffsetsforGroupcast IE and the BetaOffsets IE for groupcast and unicast respectively as an example depicted in Code Example 6 of the Appendix.

For dynamically signaling, the UE may reuse the beta_offset indicator field in the DCI scheduling the PUSCH to determine the $\beta_{offset}$ value for GC HARQ piggybacking. In one example, the beta_offset indicator field may be associated with the same set of $\beta_{offset}$ candidate values for both the GC HARQ and the UC HARQ, e.g., the UE may use the same $\beta_{offset}$ value signaled for UC HARQ piggybacking to calculate the resources used for GC HARQ piggybacking.

In another example, the beta_offset indicator field may be associated with two sets of $\beta_{offset}$ candidate values which are used for UC HARQ piggybacking and for GC HARQ piggybacking respectively. For example, the UE may be configured with both the betaOffsetACK-Index1 and the betaOffsetACKforGroupcast-Index1, respectively.

Alternatively, a new DC field, e.g., beta_offset groupcast indicator field, may be introduced in the DCI scheduling the PUSCH, e.g., DCI format 0_1, DCI format 0_2, etc. An example is depicted in Table 4 of the Appendix. When the GC $\beta_{offset}$ value is semi-statically configured by the gNB, the beta_offset groupcast indicator field has 0 bit, e.g., this field is not carried by the DCI. When the GC $\beta_{offset}$ value is dynamically signaled by the gNB, the scheduling DCI carries the beta_offset groupcast indicator field using n bit where $n=\log_2 k$ and k is the number of GC $\beta_{offset}$ candidate values configured by the gNB.

In one example, beta_offset groupcast indicator field may be associated with the same set of $\beta_{offset}$ candidate values as the beta_offset indicator field. In this example, the UE is not configured with betaOffsetACKforGroupcast-Index1, betaOffsetACKforGroupcast-Index2, etc. Both the beta_offset groupcast indicator field and the beta_offset indicator field refer to the same set of betaOffsetACK-Index1, betaOffsetACK-Index2, betaOffsetACK-Index3 candidate values configured by the gNB.

In another example, beta_offset groupcast indicator field may be associated with a different set of $\beta_{offset}$ candidate values. For example, the beta_offset groupcast indicator field may be associated with betaOffsetACKforGroupcast-Index1, betaOffsetACKforGroupcast-Index2, betaOffsetACKforGroupcast-Index3 which are configured by the gNB using the method proposed in Code Example 4 of the Appendix and Code Example 5 of the Appendix.

When a UE multiplexes the GC HARQ feedback in the PUSCH, there may be other unicast UCIs, e.g., UC HARQ, CSI, etc., to be piggybacked simultaneously. In this case, the UE may map the UC HARQ first, then map the GC HARQ next, then map SL HARQ, and then map other UCIs, e.g., CSI, after the GC HARQ. Alternatively, the UE may the GC HARQ first, the UC HARQ next, and map other UCIs, e.g., CSI, after the UC HARQ. Same idea may be applied to the puncture case, e.g., when the GC HARQ is ≤2 bits.

Besides supporting both semi-statically configuring and dynamically signaling, the $\beta_{offset}$ value for GC HARQ piggybacking may only be semi-statically configured by the gNB using the above proposed method, or it may only be dynamically signaled by the gNB as well.

In yet another scenario, the PUCCH for GC HARQ feedback may overlap with an SRS transmission. In this case, the UE may drop the transmission of SRS and transmit the GC HARQ feedback.

In yet another scenario, the PUCCH for GC HARQ feedback may overlap with a physical random access channel (PRACH) transmission, e.g., PRACH for beam failure recovery. PDCCH ordered PRACH, handover PRACH, etc. In this case, the UE may drop the transmission of GC HARQ feedback and transmit the PRACH.

Collision Handling Between GC HARQ Feedback and Sidelink Transmission.

In yet another scenario, the PUCCH for GC HARQ feedback may collide with a sidelink transmission, e.g., PSCCH, PSSCH, PSFCH, etc. For the UEs that are not capable to support simultaneous sidelink and uplink transmissions, the UE may always drop the GC HARQ feedback transmission. Alternatively, the UE may always drop the sidelink transmission. Or, the UE may apply the priority-based prioritization to drop the transmission, e.g., the deprioritized transmission is dropped.

For the UEs that are capable to support simultaneous sidelink and uplink transmissions, the UE may transmit both the GC HARQ feedback and the sidelink transmission even they collide. However, in some cases, the total power of the GC HARQ feedback transmission and the sidelink transmission may exceed the maximum power limitation, e.g., $P_{total} > P_{max}$. Then the UE need to drop certain transmission or scale back TX power of one or both transmissions by a certain proportion to meet the maximum Tx power restriction.

In one approach, the UE may compare the priority among all the GC HARQ feedback and the sidelink transmissions. The UE may drop the transmission with lower priority first. In another approach, the UE may compare the priority among all the sidelink transmissions. The UE may drop the sidelink transmission with lower priority first while the GC HARQ feedback is always prioritized and transmitted.

Example Environments

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities.

Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 8A:
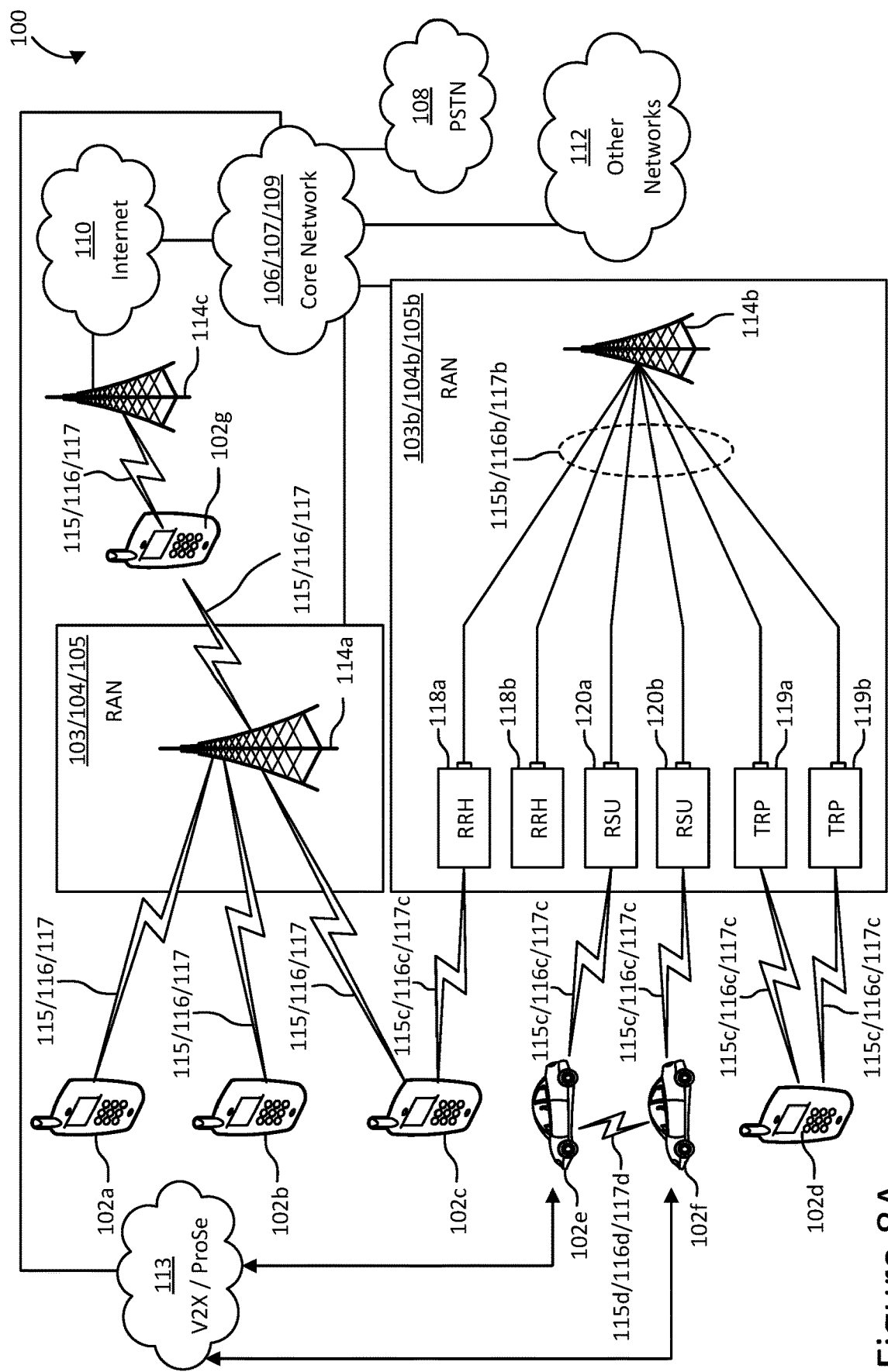
FIG. 8A illustrates an example communications system in which the methods and apparatuses described and claimed herein may be embodied.

FIG. 8A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 14A-14E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102c or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE). GSM EDGE (GERAN), and the like.

The base station 114c in FIG. 8A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 8A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 8A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a. 102b, 102c, 102d, and 102e may include multiple transceivers for communicating with different wireless networks over different wireless links. For example, the WTRU 102e shown in FIG. 8A may be configured to communicate with the base station 114a, which may employ a cellular-based radio technology, and with the base station 114c, which may employ an IEEE 802 radio technology.

Figure 8B:
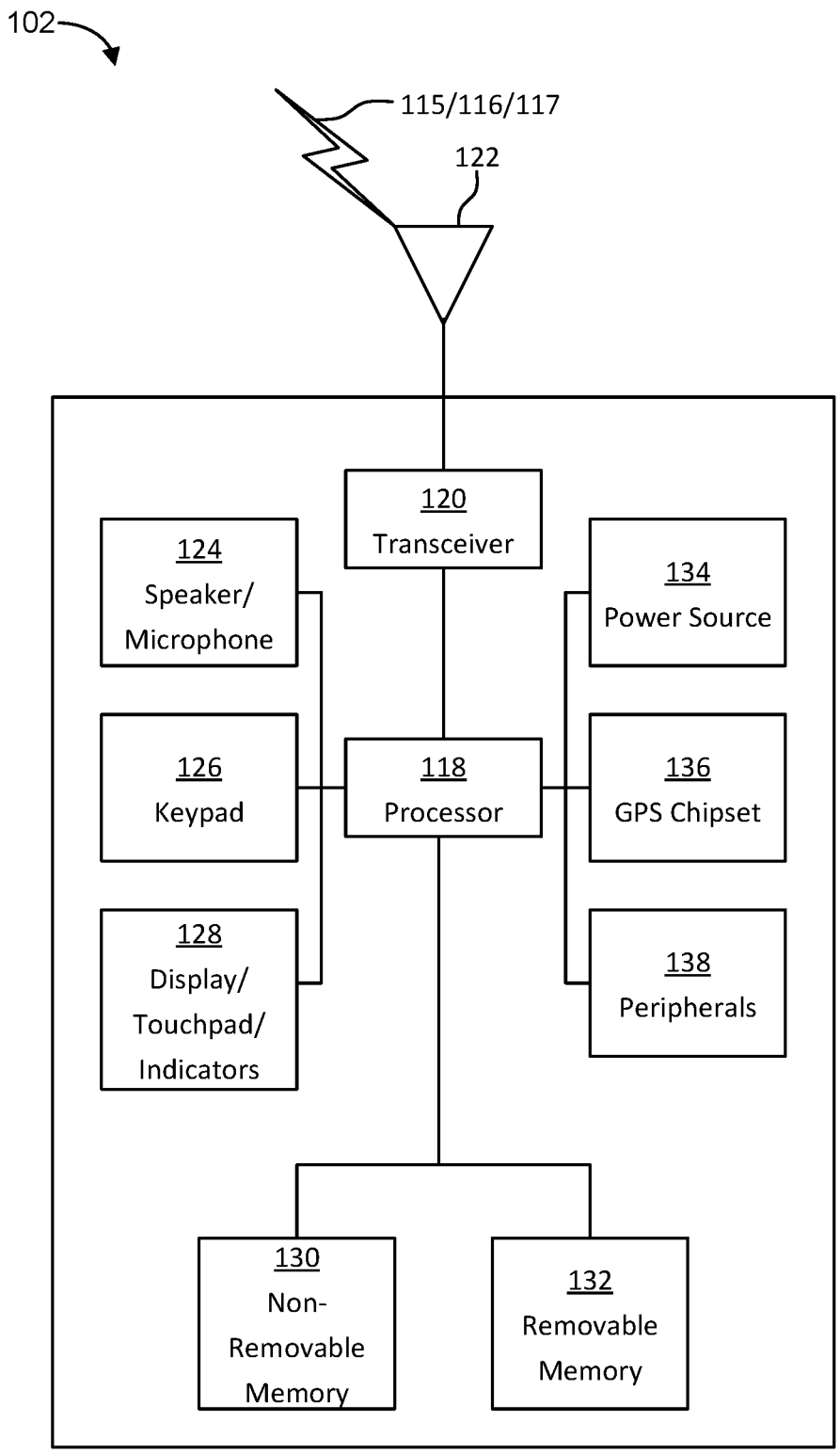
FIG. 8B is a block diagram of an example apparatus or device configured for wireless communications.

FIG. 8B is a block diagram of an example apparatus or device configured for wireless communications in accordance with the embodiments illustrated herein, such as for example, a WTRU 102. As shown in FIG. 8B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 8B and described herein.

The processor 118 may be a general purpose processor, a special purpose processor, a conventional processor, a digital signal processor (DSP), a plurality of microprocessors, one or more microprocessors in association with a DSP core, a controller, a microcontroller. Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 8B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 8B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 8C:
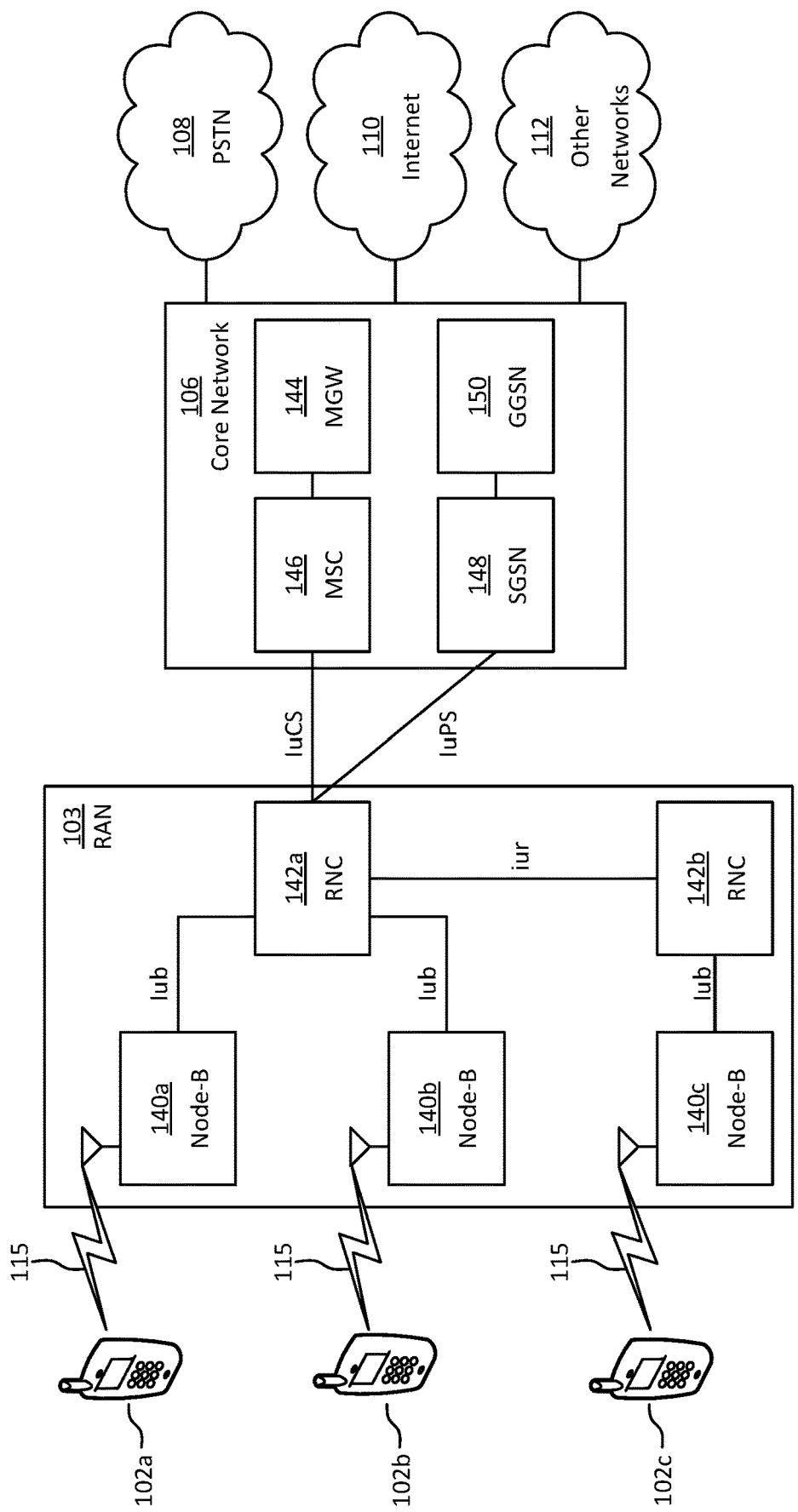
FIG. 8C is a system diagram of an example radio access network (RAN) and core network.

FIG. 8C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 8C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 8C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 8C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b. 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b. 102c and IP-enabled devices.

As noted above, the core network 106 may also be connected to the networks 112, which may include other wired or wireless networks that are owned and/or operated by other service providers.

Figure 8D:
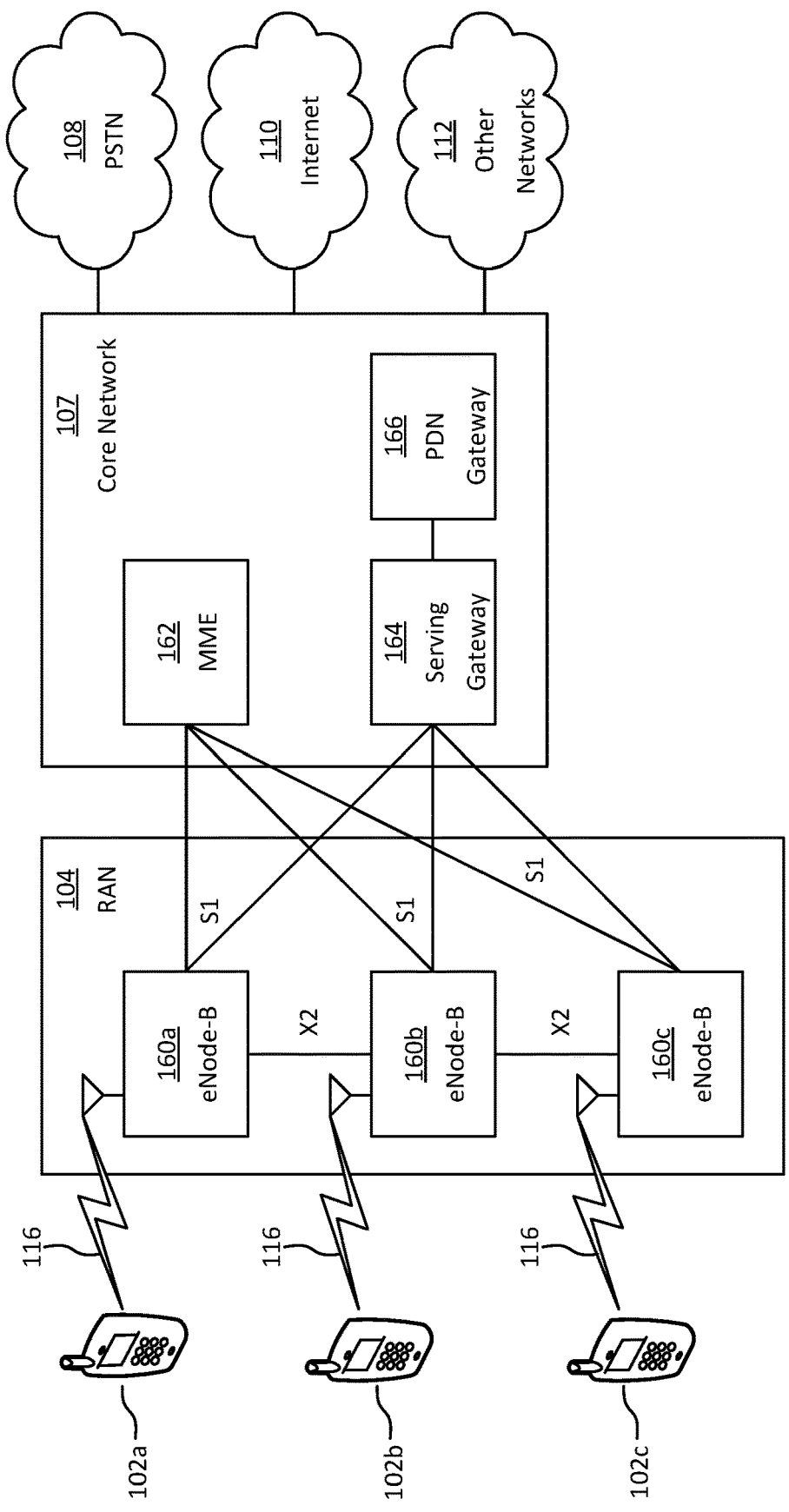
FIG. 8D is a system diagram of another example RAN and core network.

FIG. 8D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a. 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 8D, the eNode-Bs 160a, 160b, 160c may communicate with one another over an X2 interface.

The core network 107 shown in FIG. 8D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 8E:
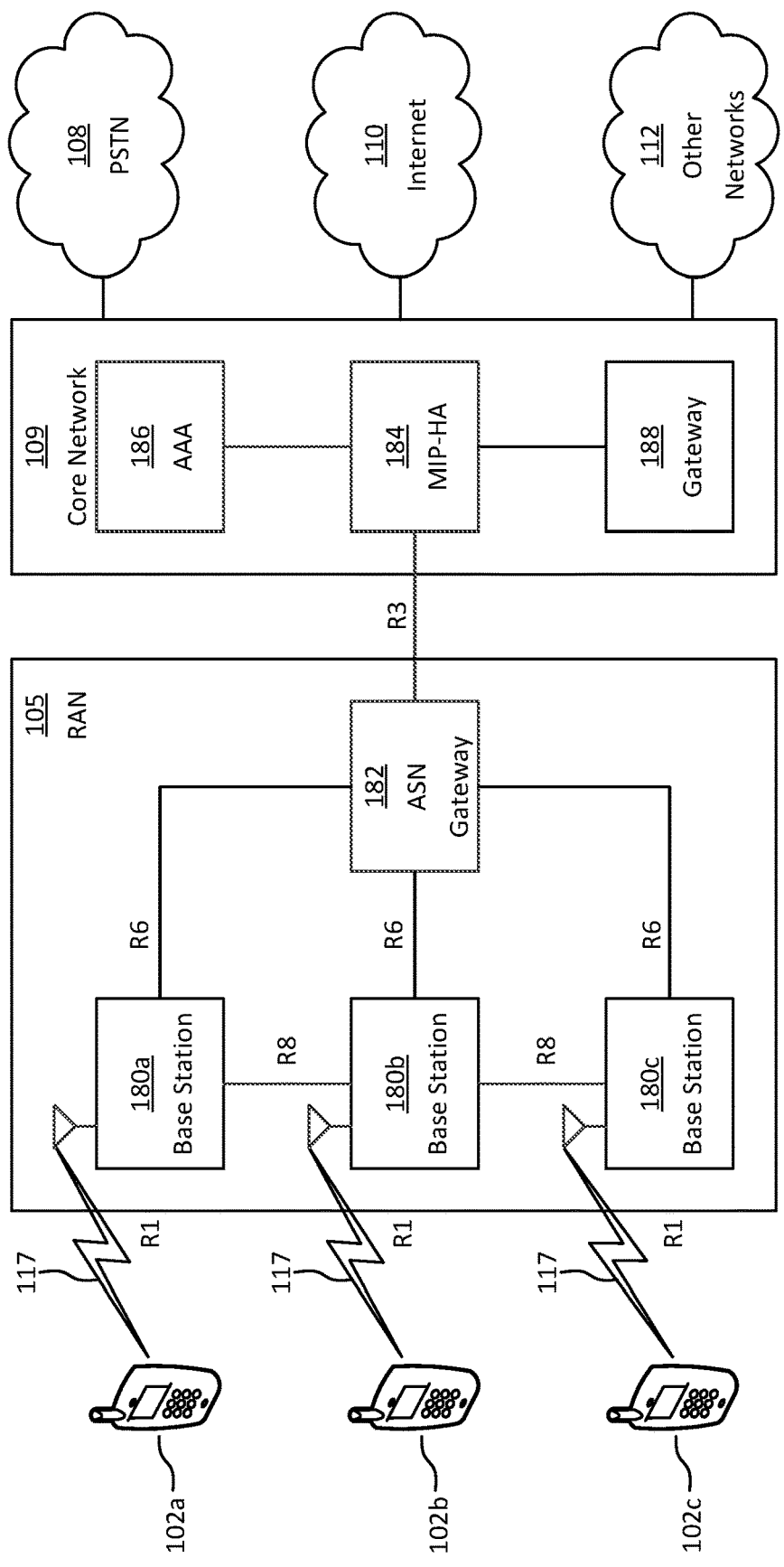
FIG. 8E is a system diagram of another example RAN and core network.

FIG. 8E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 8E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 8E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 8E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 14A, 14C, 14D, and 14E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 14A, 14B, 14C, 14D, and 14E are provided by way of example only, and it is understood that the subject matter disclosed and claimed herein may be embodied or implemented in any similar communication system, whether presently defined or defined in the future.

Figure 8F:
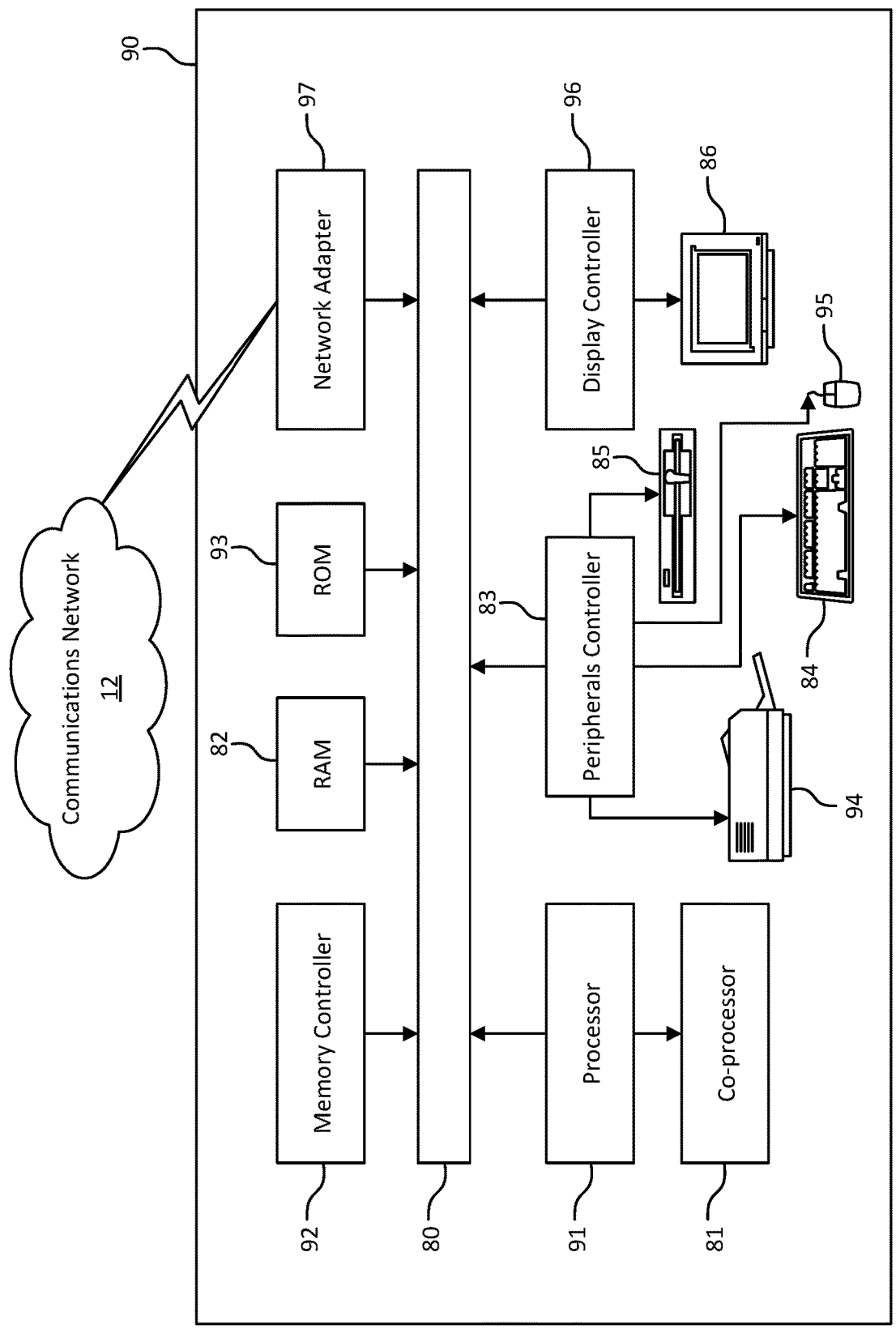
FIG. 8F is a block diagram of an example computing system.

FIG. 8F is a block diagram of an exemplary computing system 90 in which one or more apparatuses of the communications networks illustrated in FIGS. 14A, 14C, 14D and 14E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within the virtual address space of another process unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 14A, 14B, 14C, 14D, and 14E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 8G:
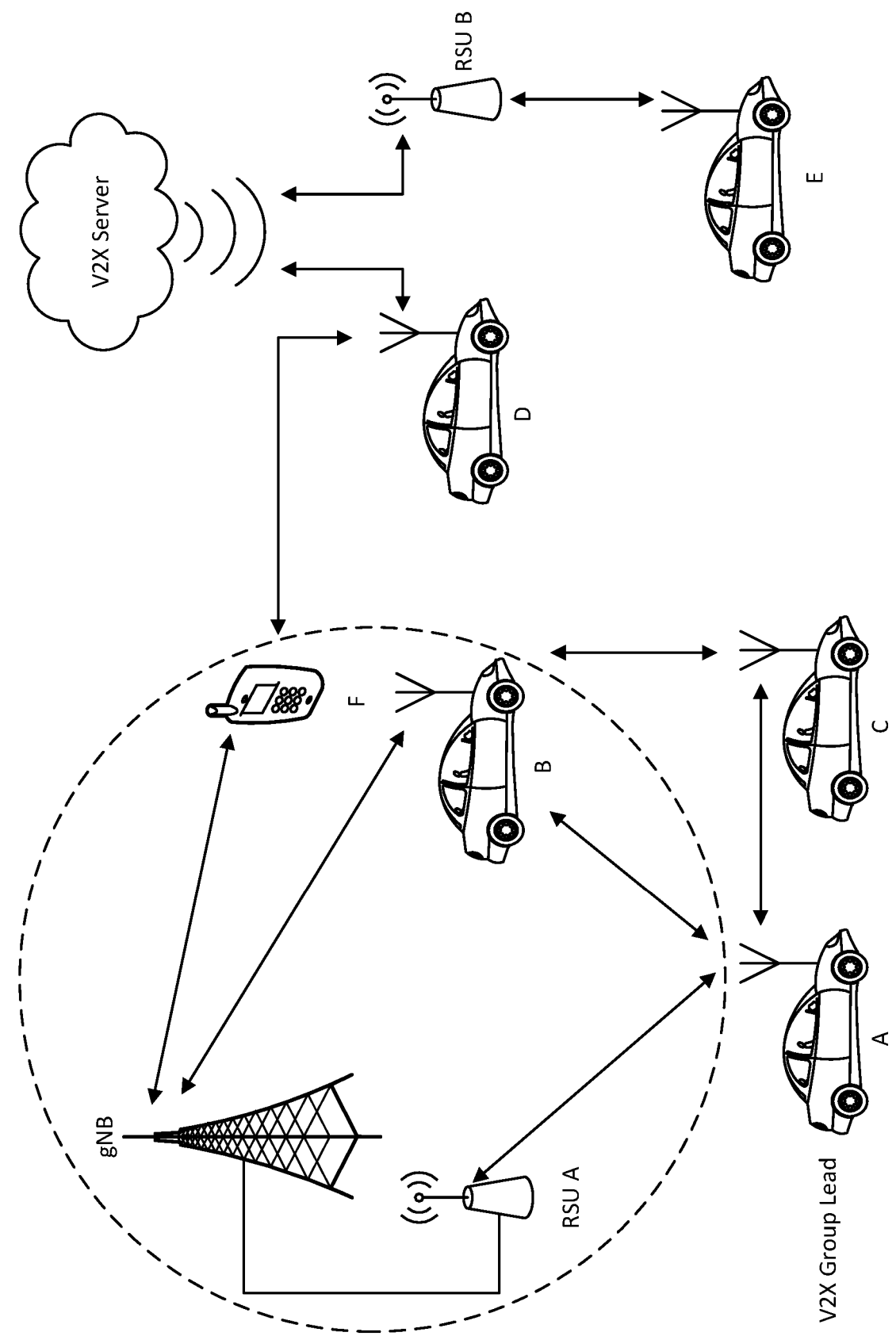
FIG. 8G is a block diagram of another example communications system.

FIG. 8G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B. C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

APPENDIX

Code Example 1

RRC Information Element
NR_Uu_Groupcast_Config

```
-- ASN1START
NR-Uu-Groupcast-Config ::=    SEQUENCE {
    NR-G-RNTI               BIT STRING(SIZE(16)),
    NR-Uu-GroupcastHARQ     ENUMERATED {Enabled, Disabled}
}
-- ASN1STOP
```

Code Example 2

RRC Information Element
NR_Uu_Groupcast_HARQ_Enable_List

```
-- ASN1START
NR-Uu-Groupcast-HARQ-Enable-List ::=
    SEQUENCE (SIZE (0..maxNR-Uu-Groupcast-HARQ-Enable)) OF
    NR-Uu-Groupcast-HARQ-Enable
NR-Uu-Groupcast-HARQ-Enable ::=    SEQUENCE {
    NR-G-RNTI               BIT STRING(SIZE(16)),
    ...
}
-- ASN1STOP
```

Code Example 3

RRC Information Clement
NR_Uu_Groupcast_HARQ_Disable_List

```
-- ASN1START
NR-Uu-Groupcast-HARQ-Disable-List ::=
    SEQUENCE (SIZE (0..maxNR-Uu-Groupcast-HARQ-Disable)) OF
    NR-Uu-Groupcast-HARQ-Disable
NR-Uu-Groupcast-HARQ-Disable ::=    SEQUENCE {
    NR-G-RNTI               BIT STRING(SIZE(16)),
    ...
}
-- ASN1STOP
```

Code Example 4

RRC Information Configuring Separate $\beta_{offset}$ Value for GC HARQ Piggybacking BetaOffsets Information Element

```
-- ASN1START
-- TAG-BETAOFFSETS-START
BetaOffsets ::=             SEQUENCE {
    betaOffsetACK-Index1        INTEGER(0..31)    OPTIONAL, -- Need S
    betaOffsetACK-Index2        INTEGER(0..31)    OPTIONAL, -- Need S
    betaOffsetACK-Index3        INTEGER(0..31)    OPTIONAL, -- Need S
```

-continued

```
    betaOffsetCSI-Part1-Index1          INTEGER(0..31)    OPTIONAL, -- Need S
    betaOffsetCSI-Part1-Index2          INTEGER(0..31)    OPTIONAL, -- Need S
    betaOffsetCSI-Part2-Index1          INTEGER(0..31)    OPTIONAL, -- Need S
betaOffsetCSI-Part2-Index2              INTEGER(0..31)    OPTIONAL -- Need S
    betaOffsetACKforGroupcast-Index1    INTEGER(0..31)    OPTIONAL, -- Need S
    betaOffsetACKforGroupcast-Index2    INTEGER(0..31)    OPTIONAL, -- Need S
    betaOffsetACKforGroupcast-Index3    INTEGER(0..31)    OPTIONAL, -- Need S
}
-- TAG-BETAOFFSETS-STOP
-- ASN1STOP
```

Code Example 5

RRC Information Element Configuring Separate $\beta_{offset}$ Value for GC HARQ Piggybacking BetaOffsetsforGroupcast Information Element

```
-- ASN1START
-- TAG-BETAOFFSETSFORGROUPCAST-START
BetaOffsetsforGroupcast ::=             SEQUENCE {
    betaOffsetACKforGroupcast-Index1    INTEGER(0..31)    OPTIONAL, -- Need S
    betaOffsetACKforGroupcast-Index2    INTEGER(0..31)    OPTIONAL, -- Need S
    betaOffsetACKforGroupcast-Index3    INTEGER(0..31)    OPTIONAL, -- Need S
}
-- TAG-BETAOFFSETSFORGROUPCAST-STOP
-- ASN1STOP
```

Code Example 6

RRC Information Configuring the BetaOffsetsforGroupcast IE and the BetaOffsets IE Separately PUSCH-Config Information Element

```
-- ASN1START
-- TAG-PUSCH-CONFIG-START
PUSCH-Config ::=                        SEQUENCE {
--SOME PARTS REMOVED FOR BREVITY
UCI-OnPUSCH ::=                         SEQUENCE {
    betaOffsets                         CHOICE {
        dynamic                             SEQUENCE (SIZE (4)) OF BetaOffsets,
        semiStatic                          BetaOffsets
    }                                   OPTIONAL, -- Need M
    betaOffsetsforGroupcast             CHOICE {
        dynamic                             SEQUENCE (SIZE (4)) OF BetaOffsetsforGroupcast,
        semiStatic                          BetaOffsetsforGroupcast
    }                                   OPTIONAL, -- Need M
    scaling                             ENUMERATED { f0p5, f0p65, f0p8, f1 }
}
UCI-OnPUSCH-ForDCI-Format0-2-r16 ::=    SEQUENCE {
    betaOffsetsForDCI-Format0-2-r16     CHOICE {
        dynamicForDCI-Format0-2-r16         CHOICE {
            oneBit-r16                          SEQUENCE (SIZE (2)) OF BetaOffsets,
            twoBits-r16                         SEQUENCE (SIZE (4)) OF BetaOffsets
        },
        semiStaticForDCI-Format0-2-r16      BetaOffsets
    }                                   OPTIONAL, -- Need M
    scalingForDCI-Format0-2-r16         ENUMERATED { f0p5, f0p65, f0p8, f1 }
}
-- TAG-PUSCH-CONFIG-ST0P
-- ASN1STOP
```

TABLE 1

Example of NR-G-RNTI Releasing Field

| Value of the NR-G-RNTI Releasing Field | NR-G-RNTI Released |
|---|---|
| 000 | No NR-G-RNTI is released |
| 001 | NR-G-RNTI configured in the $1^{st}$ row of the table is released |
| ... | ... |
| 111 | NR-G-RNTI configured in the $7^{th}$ row of the table is released |

TABLE 2

Example of Value range based HARQ enabling/disabling

| NR-G-RNTI value | HARQ enable or disable |
|---|---|
| $n_0 \leq n_{NR\text{-}G\text{-}RNTI} \leq n_1$ | HARQ enabled |
| $n_1 < n_{NR\text{-}G\text{-}RNTI} \leq n_2$ | HARQ disabled |

TABLE 3

Example of HARQ Enable Indicator Field

| Value of the HARQ enable indicator field | HARQ enabled or disabled |
|---|---|
| 0 | HARQ disabled |
| 1 | HARQ enabled |

TABLE 4

Example of beta_offset Groupcast Indicator Field

| Value of the beta_offset groupcast indicator field | $\beta_{offset,1}^{GC\text{-}HARQ}$ or $\beta_{offset,2}^{GC\text{-}HARQ}$ or $\beta_{offset,3}^{GC\text{-}HARQ}$ |
|---|---|
| 00 | $1^{st}$ offset index provided by higher layers |
| 01 | $2^{nd}$ offset index provided by higher layers |
| 10 | $3^{rd}$ offset index provided by higher layers |
| 11 | $4^{th}$ offset index provided by higher layers |

TABLE 5

Acronyms

| ACK | ACKnowledgement |
|---|---|
| B-RNTI | |
| C-RNTI | |
| CSI | Channel State Information |
| DCI | Downlink Control Information |
| DMRS | Demodulation Reference Signal |
| FDM | Frequency-Division Multiplexing |
| GC | Groupcast |
| gNB | |
| G-RNTI | Group Radio Network Temporary Identifier |
| HARQ | Hybrid Automatic Repeat Request |
| IIoT | Industrial Internet of Things |
| LSB | Least Significant Bit |
| LTE | Long Term Evolution |
| MAC | Medium Access Control |
| MAC-CE | MAC Control Element |
| MAC PDU | |
| MBMS | Multimedia broadcast multicast services |
| MBSFN | Multicast-Broadcast Single Frequency Network |
| MIMO | |
| MSB | Most Significant Bit |
| NACK | Non-ACKnowledgement |
| NR | New Radio |
| OSI | Other System Information |
| PC5 | |
| PDCCH | Physical Downlink Control Channel |
| PDSCH | Physical Downlink Shared Channel |
| PHY | |
| PRACH | Physical Random Access Channel |
| PSCCH | Physical Sidelink Control Channel |
| PSFCH | Physical Sidelink Feedback Channel |
| PSSCH | Physical Sidelink Shared Channel |
| PMCH | Physical Multicast Channel |
| PUCCH | Physical Uplink Control Channel |
| PUSCH | Physical Uplink Shared Channel |
| QoS | Quality of Service |
| RAN | Radio Access Network |
| RB | |
| Rel-8 | |
| RMSI | Remain Minimum System Information |
| RNTI | Radio Network Temporary Identifier |
| RRC | Radio Resource Control |
| RSRP | Reference Signal Received Power |
| RSRQ | Reference Signal Received Quality |
| RSSI | Received Signal Strength Indicator |
| SCI | Sidelink Control Information |
| SC-PTM | Single-Cell Point to Multipoint |
| SC-RNTI | |
| SIBs | |
| SINR | Signal to Interference & Noise Ratio |
| SL | Sidelink |
| SR | Scheduling Request |
| SRS | Sounding Reference Signal |
| SS-RSRP | |
| TDM | Time-Division Multiplexing |
| UC | Unicast |
| UCI | Uplink Control Information |
| UE | User Equipment |
| UL | |
| Uu | |
| V2X | Vehicle-to-everything |

What is claimed is:

1. An apparatus, comprising a processor, a memory, and communication circuitry, the apparatus being connected to a network via the communication circuitry, the apparatus further comprising computer-executable instructions stored in the memory which, when executed by the processor, cause the apparatus to:
receive one or more Radio Network Temporary Identifiers (RNTIs) pertaining to at least one groupcast service or broadcast service,
wherein the one or more RNTIs includes a first RNTI pertaining to a first groupcast service or broadcast service of the at least one groupcast service or broadcast service;
receive a first Hybrid Automatic Repeat Request (HARQ) configuration indicating whether a HARQ is enabled or disabled for the first RNTI;
receive a first set of transmissions, the first set of transmissions being part of the first groupcast service or broadcast service;
determine whether the HARQ is enabled or disabled for the first groupcast service or broadcast service based on the first HARQ configuration;
based on the HARQ being enabled for the groupcast service or broadcast service, transmit a HARQ feedback for the first set of transmissions; and
based on the HARQ being disabled for the groupcast service or broadcast service, not transmit the HARQ feedback for the first set of transmissions.

2. The apparatus of claim 1, wherein the first HARQ configuration comprises a first indicator of HARQ enablement for the first groupcast service or broadcast service.

3. The apparatus of claim 2, wherein the instructions further cause the apparatus to:
receive a second HARQ configuration indicating whether a HARQ is enabled or disabled for a second RNTI of the one or more RNTIs, the second HARQ comprising a second indicator of a hybrid HARQ enablement for a second groupcast service or broadcast service of the at least one groupcast service or broadcast service; and
receive a second set of transmissions, the second set of transmissions being part of the second groupcast service or broadcast service.

4. The apparatus of claim 3, wherein the first HARQ configuration and the second HARQ configuration are transmitted via RRC signaling.

5. The apparatus of claim 4, wherein the instructions further cause the apparatus to:
monitor, upon detecting the second indicator, an indication in Downlink Control Information (DCI) pertaining to the second groupcast service or broadcast service, wherein the indication indicates whether the HARQ is enabled or disabled for the second groupcast service or broadcast service.

6. The apparatus of claim 5, wherein the indication in DCI is a one-bit DCI field.

7. The apparatus of claim 1, wherein, based on the HARQ being enabled for the first groupcast service or broadcast service, the HARQ feedback is transmitted by being multiplexed with a HARQ feedback for a unicast.

8. An apparatus, comprising a processor, a memory, and communication circuitry, the apparatus being connected to a network via the communication circuitry, the apparatus further comprising computer-executable instructions stored in the memory which, when executed by the processor, cause the apparatus to:
configure one or more Radio Network Temporary Identifiers (RNTIs) pertaining to at least one groupcast service or broadcast service,
wherein the one or more RNTIs includes a first RNTI pertaining to a first groupcast service or broadcast service of the at least one groupcast service or broadcast service;
transmit a first Hybrid Automatic Repeat Request (HARQ) configuration indicating whether a HARQ is enabled or disabled for the first RNTI;
transmit a first set of transmissions, the first set of transmissions being part of the first groupcast service or broadcast service; and
based on the HARQ being enabled for the groupcast service or broadcast service, receive a HARQ feedback for the first set of transmissions; and
based on the HARQ being disabled for the groupcast service or broadcast service, not receive the HARQ feedback for the first set of transmissions,
wherein whether the HARQ is enabled or disabled for the first groupcast service or broadcast service is determined based on the first HARQ configuration.

9. The apparatus of claim 8, wherein the first HARQ configuration comprises a first indicator of HARQ enablement for the first groupcast service or broadcast service.

10. The apparatus of claim 9, wherein the instructions further cause the apparatus to:
transmit a second HARQ configuration indicating whether a HARQ is enabled or disabled for the second RNTI of the one or more RNTIs, the second HARQ comprising a second indicator of a hybrid HARQ enablement for a second groupcast service or broadcast service of the at least one groupcast service or broadcast service; and
transmit a second set of transmissions, the second set of transmissions being part of the second groupcast service or broadcast service.

11. The apparatus of claim 10, wherein the first HARQ configuration and the second HARQ configuration are transmitted via RRC signaling.

12. The apparatus of claim 11, wherein the instructions further cause the apparatus to:
transmit, after sending the second indicator, an indication in Downlink Control Information (DCI) pertaining to the second groupcast service or broadcast service, the indication is indicating whether the HARQ is enabled or disabled for the second groupcast service or broadcast service.

13. The apparatus of claim 12, wherein the indication in DCI is a one-bit DCI field.

14. The apparatus of claim 8, wherein, based on the HARQ being enabled for the first groupcast service or broadcast service, the HARQ feedback is transmitted by multiplexed with a HARQ feedback for a unicast.

15. A method for a network node, the method comprising:
configuring one or more Radio Network Temporary Identifiers (RNTIs) pertaining to at least one groupcast service or broadcast service,
wherein the one or more RNTIs includes a first RNTI pertaining to a first groupcast service or broadcast service of the at least one groupcast service or broadcast service;
transmitting a first Hybrid Automatic Repeat Request (HARQ) configuration indicating whether a HARQ is enabled or disabled for the first RNTI;
transmitting a first set of transmissions, the first set of transmissions being part of the first groupcast service or broadcast service; and
based on the HARQ being enabled for the groupcast service or broadcast service, receiving the HARQ feedback for the first set of transmissions; and
based on the HARQ being disabled for the groupcast service or broadcast service, not receiving the HARQ feedback for the first set of transmissions,
wherein whether the HARQ is enabled or disabled for the first groupcast service or broadcast service is determined based on the first HARQ configuration.

* * * * *